(12) United States Patent
Tsukizawa et al.

(10) Patent No.: US 7,889,244 B2
(45) Date of Patent: Feb. 15, 2011

(54) IMAGE PROCESSING APPARATUS

(75) Inventors: Sotaro Tsukizawa, Tokyo (JP); Keisuke Hayata, Kanagawa (JP); Megumi Yamaoka, Tokyo (JP)

(73) Assignee: Panasonic Corporation, Osaka (JP)

( * ) Notice: Subject to any disclaimer, the term of this patent is extended or adjusted under 35 U.S.C. 154(b) by 205 days.

(21) Appl. No.: 12/159,416

(22) PCT Filed: Dec. 26, 2006

(86) PCT No.: PCT/JP2006/325968

§ 371 (c)(1),
(2), (4) Date: Feb. 19, 2009

(87) PCT Pub. No.: WO2007/074842

PCT Pub. Date: Jul. 5, 2007

(65) Prior Publication Data

US 2009/0273687 A1    Nov. 5, 2009

(30) Foreign Application Priority Data

Dec. 27, 2005  (JP) .............................. 2005-374448
Dec. 26, 2006  (JP) .............................. 2006-349800

(51) Int. Cl.
*H04N 5/228* (2006.01)
(52) U.S. Cl. .................. 348/222.1; 348/77; 348/78; 382/164; 382/165
(58) Field of Classification Search .................. 348/77, 348/78, 222.1; 382/103, 104, 117, 118, 164, 382/165; 351/210, 222, 211, 212; 706/15, 706/17, 20
See application file for complete search history.

(56) References Cited

U.S. PATENT DOCUMENTS 7,003,139 B2 * 2/2006 Endrikhovski et al. ...... 382/118
(Continued)

FOREIGN PATENT DOCUMENTS

JP          09147119          6/1997
(Continued)

OTHER PUBLICATIONS

International Search Report dated Feb. 2, 2007.
(Continued)

*Primary Examiner*—Yogesh K Aggarwal
(74) *Attorney, Agent, or Firm*—Pearne & Gordon LLP

(57) ABSTRACT

There is provided an image processing apparatus for performing a stable attention condition determination, regardless of the shape and surrounding environment of an object of interest and regardless that the object is unknown or known. The image processing apparatus comprises a direction detector, a displacement detector, and an attention condition determiner. The direction detector detects, from a certain image including a person image, the direction information in two body regions of a person represented by the person image. The displacement detector calculates, from the two direction information, a displacement ratio that is the ratio between the two direction displacements. The attention condition determiner determines, according to a first and a second displacement ratio, how much the person pays attention to a certain object. The first displacement ratio is calculated in the displacement detector by using first direction information detected by the direction detector from a first certain image including a first person image, and the second displacement ratio is calculated in the displacement detector by using second direction information detected by the direction detector from a second certain image including the first person image.

7 Claims, 17 Drawing Sheets

U.S. PATENT DOCUMENTS 7,043,056 B2 * 5/2006 Edwards et al. ............. 382/103
7,306,337 B2 * 12/2007 Ji et al. ....................... 351/209

FOREIGN PATENT DOCUMENTS

JP  2001260776  9/2001
JP  2004062393  2/2004

OTHER PUBLICATIONS

Takehiko Ohno, "Impact: Eye Mark Reusing Technique to Support Information Browsing Task", Interactive Systems and Software, WISS 2000, pp. 137-146, 2000.

Notice of Reasons for Rejection dated Jul. 13, 2010 for Appl. No. 2006-349800.

Yamada, Tatsumi, et al., "A Method of Labeling Human Behavior Based Based on Walking Trajectory and Attentional Direction", Transaction of Information Processing Society of Japan, Sep. 15, 2005, pp. 2250-2259, vol. 46, No. 9.

* cited by examiner

IMAGE PROCESSING APPARATUS

TECHNICAL FIELD

The present invention relates to an image processing apparatus that determines the degree of attention paid by an imaged person to an object in the line of sight direction of the imaged person.

BACKGROUND ART

With a conventional image processing apparatus that detects the direction of attention of a person, the face area of a person of interest is extracted from an image acquired by camera imaging, an eye area of a part corresponding to a human eye is detected from that area, and the line of sight direction is detected from that eye area by means of image processing.

However, with this kind of apparatus, only detection of the line of sight direction is performed, and it is not determined whether or not the person of interest is paying attention in that direction.

Therefore, the relationship between information acquired by an image processing apparatus and the intention of a person of interest in terms of whether or not that person of interest is paying attention in that direction is unknown, and ways of using the acquired information are limited.

In response to this problem, a direction-of-attention detection method has been proposed whereby, as a means of determining the attention level—that is, the degree of attention—of a person, a face direction is found at fixed discrete times, a temporal variation pattern and statistics are calculated, and the attention state of the person is estimated by comparing these with previously obtained standard reference data (see Patent Document 1, for example).

Also, an attention level determination method has been proposed whereby a person of interest is determined to be paying attention if an object of interest is moved and the line of sight moves in line with that movement (see Patent Document 2, for example).

There are also other attention level determination methods, such as dividing a document into a plurality of areas, setting an area attention level for each area, and taking the sum thereof as the document attention level.

With this method, if the line-of-sight dwell time is long, or there are a plurality of dwell times, the area attention level is increased, and if that area is not being looked at even though the object is being looked at, attenuation is performed gently in area attention (see Non-patent Document 1, for example).

Patent Document 1: Japanese Patent Application Laid-Open No. HEI 9-147119

Patent Document 2: Japanese Patent Application Laid-Open No. 2004-62393

Non-patent Document 1: Takehiko Ohno, Interactive Systems and Software, WISS 2000, pp. 137-146, 2000

DISCLOSURE OF INVENTION

Problems to be Solved by the Invention

However, problems with the conventional image processing apparatus of Patent Document 1 are that, since a line of sight direction and face direction rarely coincide, the reliability of a direction of attention itself is low, and since the line-of-sight dwell time varies greatly according to the complexity of an object of interest and the surrounding conditions, it is difficult to decide upon a generally applicable threshold value.

There are also problems with the conventional image processing apparatuses of Patent Document 2 and Non-patent Document 1, in that an object of interest must be known beforehand in order to perform object of interest tracking and area division, and application is not possible to objects of interest in general.

It is an object of the present invention to provide an image processing apparatus that performs stable attention state determination regardless of the shape and surrounding environment of an object of interest, and regardless of whether the object is known or unknown.

Means for Solving the Problems

An image forming apparatus of the present invention has: a direction detection section that detects, from a predetermined image including a person image, direction information in two body regions of a person represented by the person image; a displacement detection section that calculates, from the two direction information items, a displacement ratio that is the ratio between the two direction displacements; and an attention state determination section that performs determination of the attention level of a person toward a predetermined object based on a first displacement ratio calculated by the displacement detection section using first direction information detected by the direction detection section from a first predetermined image including a first person image, and a second displacement ratio calculated by the displacement detection section using second direction information detected by the direction detection section from a second predetermined image including the first person image.

By means of this configuration, attention level determination can be implemented by means of the correlation of a plurality of body region movements, thereby making possible more stable attention level determination than in the case of a method that uses only a single body region.

Advantageous Effect of the Invention

The present invention has an effect of reducing erroneous operation in attention determination, and enabling stable attention state determination to be performed.

BEST MODE FOR CARRYING OUT THE INVENTION

The present invention relates to an image processing apparatus and so forth that detects the head direction and eye direction from a person image, and performs stable attention state determination from the correlation between the head direction and eye direction.

Embodiments of the present invention will now be described with reference to the above drawings.

Embodiment 1

An image processing apparatus according to this embodiment detects a head direction and eye direction from a person image, and performs stable attention state determination from the displacement between the head direction and eye direction.

An image processing apparatus of this embodiment can be applied to a device for which information as to what the operator is paying attention to is necessary, including an information presentation device such as a car navigation system, TV, or speaker, a safety state monitoring device such as a vehicle-mounted camera or surveillance camera, an image recording device such as a still camera or video camera, and a life supporting device such as a robot.

Furthermore, an image processing apparatus of this embodiment can also be applied to an amusement device such as a TV game or sensory video game machine, based on information as to what the operator is paying attention to.

As an example of an image processing apparatus of the present invention, in this embodiment an image processing apparatus of the present invention is applied to a car navigation system that provides information in real time on the object of a driver's attention while driving, and stores information relating to objects glanced at. This is described in detail below.

Before describing the invention presented in this embodiment, the terms "attention", "non-attention", and "glance" used in the present application including this embodiment will first be explained.

"Attention" denotes directing one's line of sight toward a particular object, and taking a good look at that object.

"Non-attention" denotes not directing one's line of sight toward a particular object.

In contrast, "glance" denotes taking a quick look, and in this embodiment is intended to indicate "an act or state of visually recognizing the presence of an object, but after such recognition, not attempting to obtain or thinking of obtaining more detailed information thereon."

Also, a state of movement of an eyeball when "glancing" is intended to indicate "a state in which the line of sight is made to dwell in the direction of an object for a short time sufficient to enable the presence of the target object to be recognized, after which, when the line of sight direction is changed, the head moves in the same direction as the direction of movement of the line of sight virtually simultaneously with or a moment later than the movement of the line of sight, but moves in another direction before the movement is completed or in an extremely short time after completion."

Figure 1:
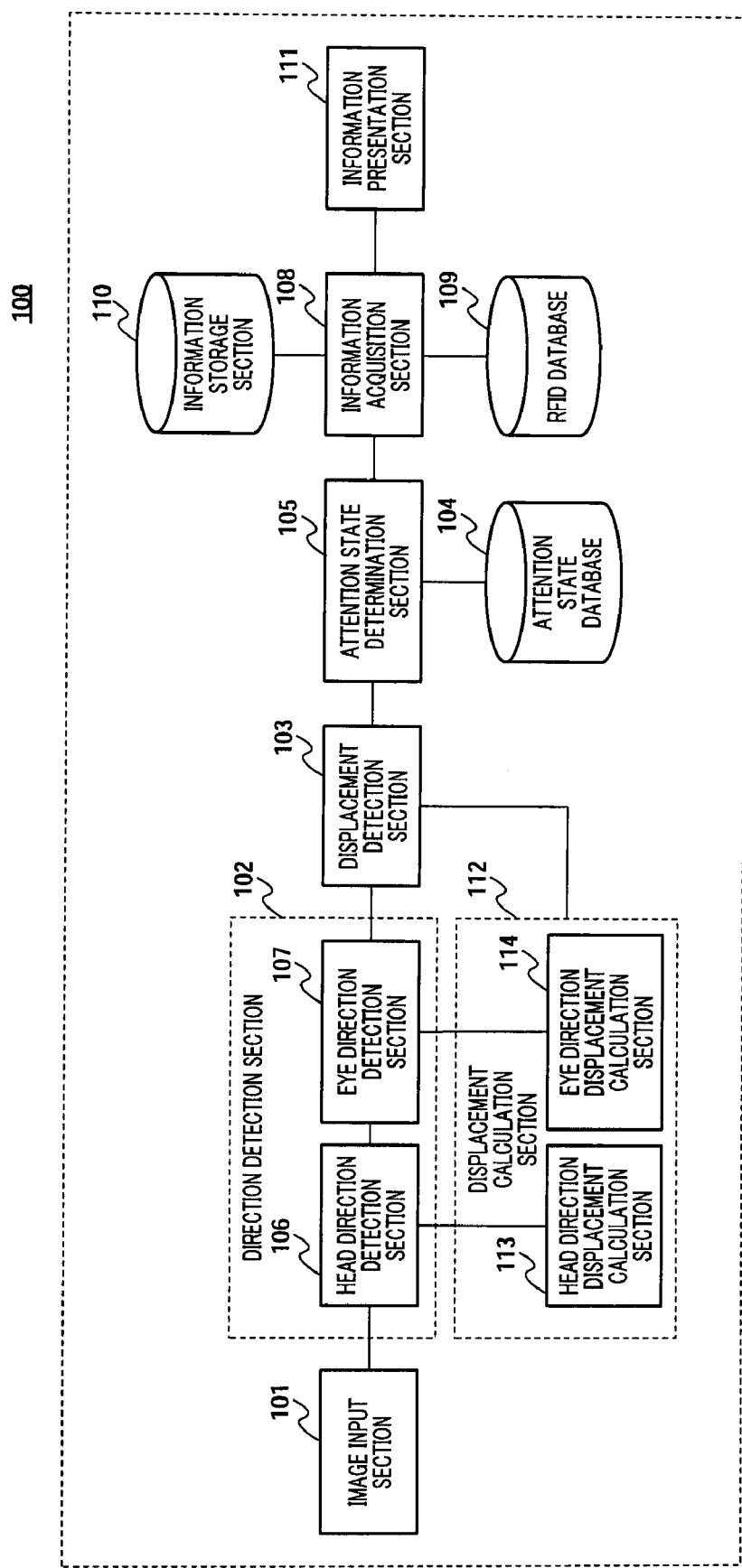
FIG. 1 is a block diagram showing the configuration of an image processing apparatus according to Embodiment 1 of the present invention.

FIG. 1 is a block diagram showing the configuration of an image processing apparatus of the present invention included in a car navigation system according to Embodiment 1 of the present invention.

Image processing apparatus 100 shown in FIG. 1 has the following configuration inside.

Image input section 101 outputs an image input by a CCD (Charge Coupled Device), CMOS (Complementary Metal Oxide Semiconductor), or suchlike image sensor to direction detection section 102 described later herein.

Direction detection section 102 detects a person image that is an image of a person from the image output by image input section 101, detects the head direction and eye direction of that person image, and outputs these as head and eye direction information to displacement detection section 103 described later herein.

This direction detection section 102 is equipped with head direction detection section 106 and eye direction detection section 107. Head direction detection section 106 detects a head area from an image input from image input section 101, detects the head direction from that head area, and outputs this as head direction information. Eye direction detection section 107 detects an eye direction from the head area detected by head direction detection section 106, and outputs this as eye direction information.

Head area detection is performed, for example, by detecting a plurality of ellipses by means of Hough transformation from the input image, and taking an ellipse whose size, shape, and position is closest to a head as a head area.

In head direction detection by head direction detection section 106 described above, for example, template matching is performed using eye, nose, and mouth shading templates prepared beforehand, eye, nose, and mouth positions are detected, and direction is estimated from the positional relationship of these within the head area.

Head direction information is obtained as an angle relative to the front of the body (hereinafter referred to simply as "front").

In eye direction detection by eye direction detection section 107 described above, for example, the outer corner of the eye and inner corner of the eye are first detected by means of angular point detection using a SUSAN operator in an eye area detected in head direction detection.

Next, edge detection is performed on the eye area, an ellipse corresponding to the pupil outline is detected by means of Hough transformation using detected edge points, and the center of the detected ellipse is detected as the pupil center.

Lastly, a database is referenced in which previously generated positional relationships of an inner corner of the eye, outer corner of the eye, and pupil center, are associated with eye direction. In this way, the eye direction is detected.

Head direction information is obtained as an angle relative to the front of the head.

Displacement detection section 103 calculates a ratio of the head and eye direction displacements from head direction information and eye direction information output from direction detection section 102, and outputs this as displacement ratio information to an attention state determination section described later herein.

In attention state database 104 there are stored beforehand head direction information and eye direction information, and/or displacement ratio information, and attention determination conditions that determine a corresponding attention state.

Attention determination conditions used for attention state determination stored in attention state database 104 will be described later herein.

Direction information output from direction detection section 102 or displacement ratio information output from displacement detection section 103 is held in attention state determination section 105 as history. Attention state determination section 105 determines a degree of attention from held direction information and displacement ratio information based on an attention determination condition stored in attention state database 104.

The history may be displacement ratio information from time t to time t+n, or may be immediately preceding displacement ratio information (if the current displacement ratio information is time t information, history is time t−1 information).

The history may also be stored in a memory section other than attention state determination section 105, and a configuration may be used such that this storage section is referenced each time the history is used.

Information acquisition section 108 identifies an object of interest from an RFID (Radio Frequency Identification) tag provided on the object of interest, acquires information relating to the object of interest from RFID database 109, and outputs this to information storage section 110 described later herein.

RFID database 109 stores RFID tag information and information on an object provided with a tag in mutually associated form.

In this embodiment, an RFID is provided for an object of interest, and information on an object of interest provided with this RFID is stored in RFID database 109, but this is not a limitation. In applying the present invention, those skilled in the art may use various other technologies used for identifying numerous objects of interest as a means of identifying this object of interest.

Information storage section 110 stores information output from information acquisition section 108.

Information presentation section 111 presents information acquired by information acquisition section 108 to the user.

Possible examples of information presentation section 111 include a cathode ray tube, a liquid crystal display, a plasma display, an organic EL (Electro-Luminescence) display, a speaker, and so forth.

The operation of image processing apparatus 100 according to this embodiment will now be described.

Figure 2:
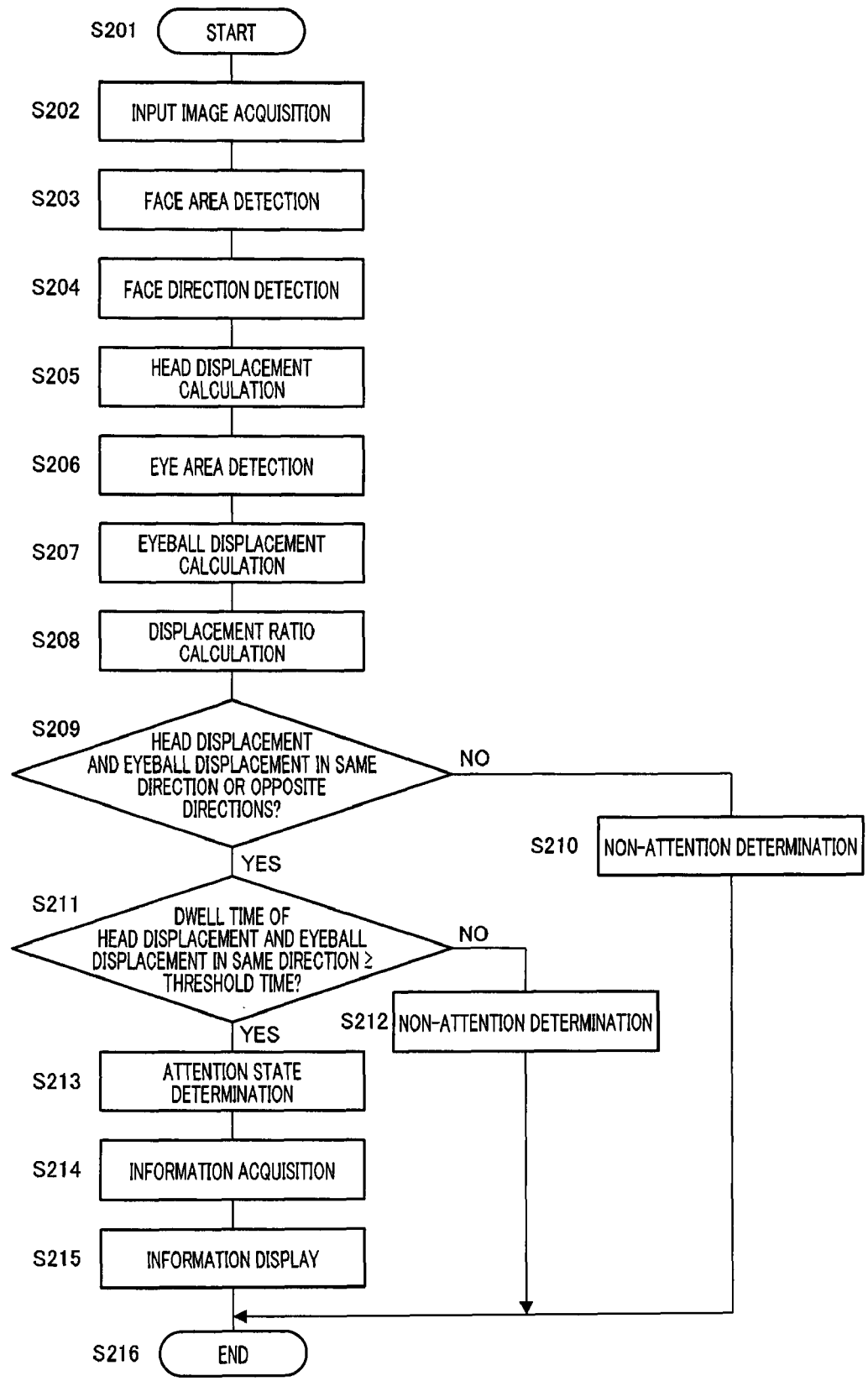
FIG. 2 is a flowchart showing the processing flow of an image processing apparatus according to Embodiment 1 of the present invention.

FIG. 2 is a flowchart showing the operation flow of image processing apparatus 100 having the configuration shown in FIG. 1 above.

In FIG. 2, in step S201 image input section 101 starts imaging operation.

The start of imaging operation may be performed manually or may be performed by image processing apparatus 100 with an external signal of some kind as a trigger.

Then, in step S202, image input section 101 acquires an image projected onto the imaging surface of a camera at fixed intervals, and outputs this acquired image to direction detection section 102.

For example, a digital camera equipped with a CMOS image sensor may be assumed for image input section 101, and a PPM (Portable Pix Map file format) image or the like captured thereby is temporarily stored in an image storage section (such as PC memory space, for example) in the image input section.

Then this temporarily stored image is input to direction detection section 102 in PPM format.

Figure 3:
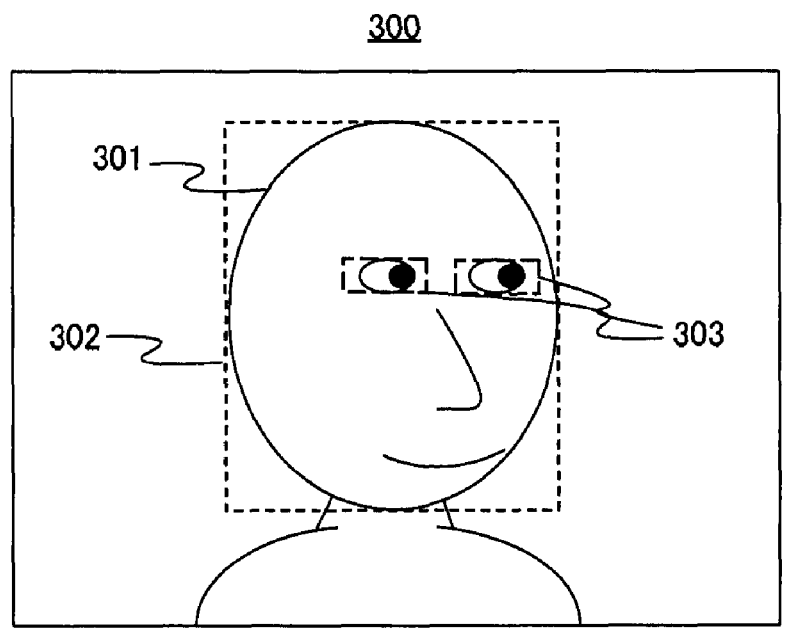
FIG. 3 is a drawing explaining an input image example according to Embodiment 1 of the present invention.

FIG. 3 shows an example of an input image input to an image processing apparatus of this embodiment—that is, an image input by image input section 101. Image 300 input by image input section 101 includes, for example, image of a person 301, face area 302, and eye area 303.

In step S203 in FIG. 2, head direction detection section 106 in direction detection section 102 takes image 301 as an input image from image 300 input by image input section 101, and performs face area 302 detection processing.

Here, face area detection may be performed, for example, by performing extraction of an image constituting a feature from the input image, comparing the extracted image constituting a feature with previously prepared feature images representing a face area, and detecting a compared image with a high degree of similarity.

For the degree of similarity, for example, a Gabor feature of an average face acquired beforehand may be checked with a Gabor feature extracted after scanning the input image, and the inverse of the absolute value of the difference may be used.

In this case, face area 302 is compared with a previously prepared template, and the area with the highest correlation in image 300 is found from the image.

Face area 302 detection may also be performed by performing skin color area detection from an image, performing ellipse detection, or using a statistical pattern recognition method.

In addition, the detection methods are not restricted to the above-described technology if the above-described face detection can be performed with a technology that can be readily applied by those skilled in the art.

In step S204, head direction detection section 106 performs face direction detection on face area 302.

In face direction detection, for example, feature points such as angle of mouth, outer corner of the eye, and inner corner of the eye, of the face area are made to approximate being on a plane, and estimation is performed from the positional relationship of those feature points in the image.

Also, for each of a plurality of face directions, a corresponding image may be prepared and caused to be learned, the nearest face direction may be estimated for an input image by means of pattern recognition, a three-dimensional face shape acquired by stereoscopy, and a face direction detected therefrom.

In addition, the detection methods are not restricted to the above-described technology if the above-described face detection can be performed with a technology that can be readily applied by those skilled in the art.

In step S205, head direction displacement calculation section 113 calculates head displacement relative to the body, and outputs this calculation result to displacement detection section 103.

The body direction is acquired by attaching three or more marks whose positional relationship is known to the body area of clothing beforehand, and calculating the direction of the body from the positional relationship of the marks on an image.

Also, if image processing apparatus 100 described in this embodiment is installed forward of a driver's seat, since the area ahead of a car driver's body is always constant when the driver is sitting in the driver's seat, for instance, the body direction when the driver is seated can be estimated from the positional relationship of the camera and seat. It is also possible to measure a three-dimensional position of a body by performing stereoscopy and acquire the body direction, or to calculate the body direction from the deviation between a previously acquired clothing pattern and a pattern in an image, and thereby acquire the body direction.

The above-described head displacement is obtained as an angle formed by the head direction and body direction.

In step S206, eye direction detection section 107 of direction detection section 102 detects eye area 303 from face area 302 detected by head direction detection section 106.

For eye area 303, eye direction detection section 107 is made to learn the relationship between face area 302 and the position of an eye area corresponding to the face area beforehand, and eye area 303 is estimated by eye direction detection section 107 based on this learning result.

At this time, eye direction detection section 107 also estimates information on the positions of the outer corner of the eye, inner corner of the eye, and pupil center corresponding to the eye area 303 position estimation result.

Eye direction detection section 107 may also detect endpoints of facial parts such as angle of mouth, outer corner of the eye, and inner corner of the eye, and nostrils, pupils, and so forth, using a separation filter, detect an eye area from the positional relationship of these, perform binarization of the face area, detect eyebrows, eyes, mouth, and so forth, and detect an eye area from their positional relationship.

In step S207, eye direction displacement calculation section 114 calculates eyeball displacement relative to the head, and outputs this calculation result to displacement detection section 103.

Here, positional relationships centered on an outer corner of the eye, inner corner of the eye, and center of a pupil obtained in eye area detection are used for eyeball displacement detection.

That is to say, a position of the center of a pupil with respect to an outer corner of the eye and inner corner of the eye, and a result of learning the eye direction at that time, are held beforehand in eye direction detection section 107, and an eye direction corresponding to the positions of the outer corner of the eye, inner corner of the eye, and center of a pupil estimated in step S206 is detected by check with the learning result.

It is also possible to estimate the outline shape of a pupil by means of ellipse detection, perform detection by referencing a database in which outline shapes and eye directions are associated in advance, and postulate the eyeball center, or perform detection from the relationship between the center of a pupil and the eyeball center direction.

With regard to eye displacement, when an eye direction is acquired relative to a face, the eye direction—that is, the angle with respect to the front of the head—is obtained directly as the eye displacement, and when an eye direction is acquired relative to something other than a head, such as a camera or the like, the eyeball displacement is obtained as a displacement relative to the head by finding the difference from the detected head direction.

Figure 4:
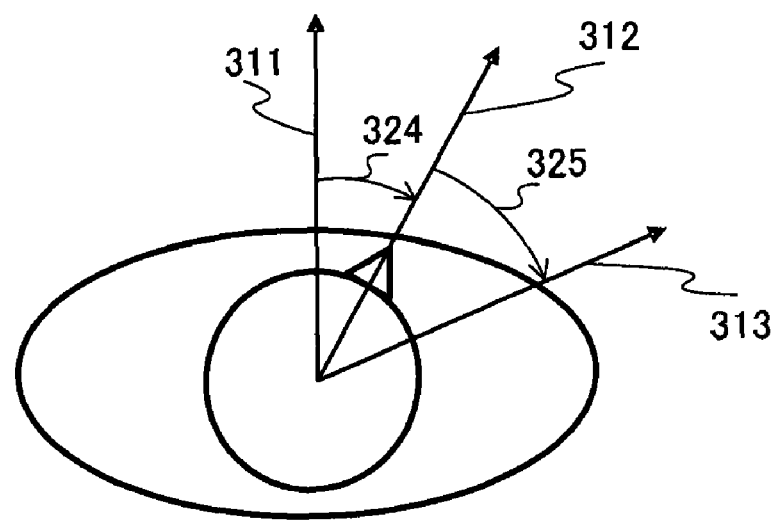
FIG. 4 is a drawing explaining body direction, face direction, and line of sight direction according to Embodiment 1 of the present invention.

FIG. 4 is a drawing for explaining the relationship between body direction, face direction, and line of sight direction. This drawing shows a representation of a person viewed from above. If it is assumed that the face rotation axis and eyeball rotation axis are now parallel to the body rotation axis, as shown in FIG. 4, head displacement 324 is the displacement up to face direction 312 relative to body direction 311 in FIG. 4.

This is calculated by head direction displacement calculation section 113.

Eyeball displacement 325 is the displacement up to line of sight direction 313 relative to face direction 312 in FIG. 4.

This is calculated by eye direction displacement calculation section 114.

For the displacement between the head direction and body direction (head displacement) 324, a clockwise displacement relative to body direction 311 is deemed to be positive, and for displacement 325 between the line of sight direction and face direction, a clockwise displacement relative to face direction 312 is deemed to be positive.

In the example shown in FIG. 4, head displacement 324 and eyeball displacement 325 are both positive.

In step S208 in FIG. 2, displacement detection section 103 acquires a displacement ratio from head displacement 324 and eyeball displacement 325, and outputs this displacement ratio to attention state determination section 105 as displacement ratio information. Displacement detection section 103 also outputs head displacement 324 and eyeball displacement 325 to attention state determination section 105 together with the displacement ratio information.

Figure 5:
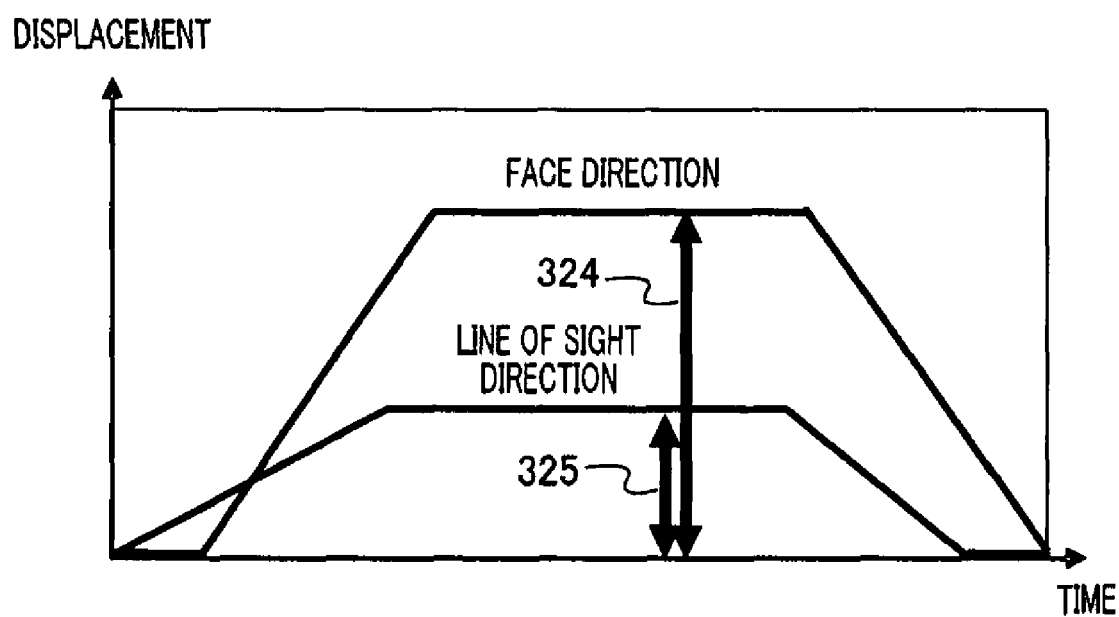
FIG. 5 is a drawing explaining an example of a displacement ratio according to Embodiment 1 of the present invention.

FIG. 5 shows an example, in a case in which attention is paid to a certain object, of displacement variation over time for a face direction with respect to the body of a person paying attention to that object and the line of sight direction with respect to the head of this person. Here, an example is shown of the nature of variation in head displacement and eyeball displacement when a person, starting from a state in which his line of sight is directed straight ahead, pays attention to an object to the right as seen from the person's perspective, and then returns his line of sight to the straight-ahead direction again. If, for example, head displacement 324 and eyeball displacement 325 such as shown in FIG. 5 are obtained in steps S205 and S207, the displacement ratio corresponds to "eye displacement 325:head displacement 324". In the example shown in FIG. 5, the displacement ratio is approximately 0.5.

In step S209 in FIG. 2, attention state determination section 105 determines whether or not a non-attention state is in effect from head displacement 324 and eyeball displacement 325 or displacement ratio information output by displacement detection section 103.

It is assumed that attention state determination section 105 stores all information as history regardless of the determination result.

As explained above, displacement ratio information is stored as history, and "attention", "non-attention", or "glance" that can be implemented according to the present application can be determined by comparing this history and information newly calculated as a displacement ratio with an above-described attention determination condition.

In attention state determination, attention state determination section 105 first compares head displacement 324 with eyeball displacement 325, and determines whether or not the head displacement and eyeball displacement are in the same direction or in opposite directions—that is, whether or not the face rotation axis and line of sight rotation axis are parallel.

Figure 6B:
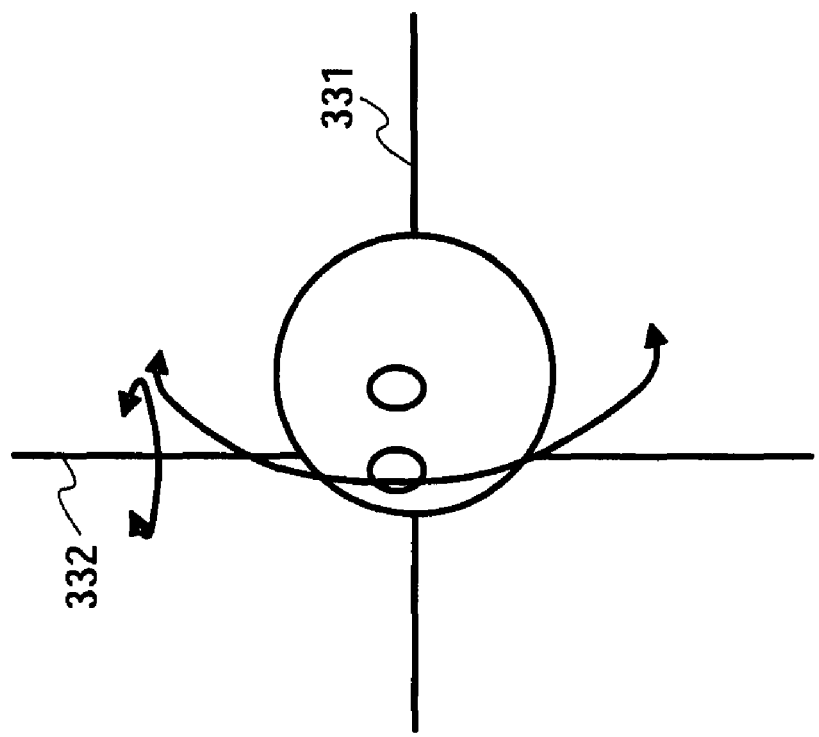
FIG. 6 is a drawing explaining a face rotation axis and line of sight rotation axis according to Embodiment 1 of the present invention.
Figure 6A:
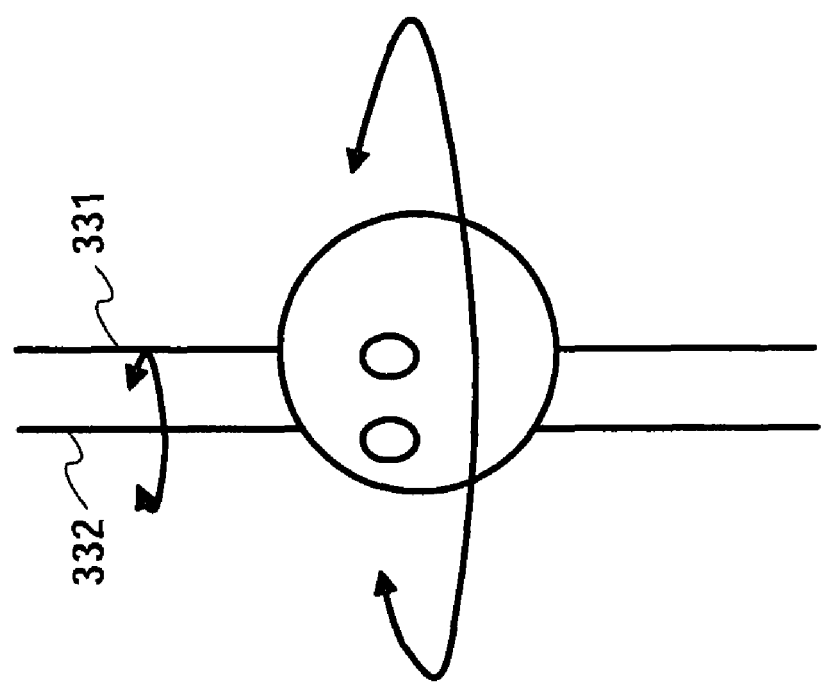

FIG. 6 is a drawing for explaining an example of the relationship between the face rotation axis and line of sight rotation axis. FIG. 6A shows an example of a case in which face rotation axis 331 and eyeball rotation axis 332 are parallel, and FIG. 6B shows an example of a case in which face rotation axis 331 and eyeball rotation axis 332 are not parallel. Face rotation axis 331 passes through the center of the head, and eyeball rotation axis 332 passes through the center of an eyeball (here, the center of the right eyeball).

If face rotation axis 331 and eyeball rotation axis 332 are not parallel as shown in FIG. 6B (FIG. 2 step S209: NO), the processing flow proceeds to step S210 in FIG. 2, and attention state determination section 105 determines a non-attention state.

It is not necessary for face rotation axis 331 and eyeball rotation axis 332 to be exactly parallel, and an error of ±α degrees with respect to face rotation axis 331 is permissible. The value of α is decided in advance.

On the other hand, if face rotation axis 331 and eyeball rotation axis 332 are parallel as shown in FIG. 6A (FIG. 2 step S209: YES), a non-attention state is not determined at this stage, and the processing flow proceeds to step S211.

Figure 7:
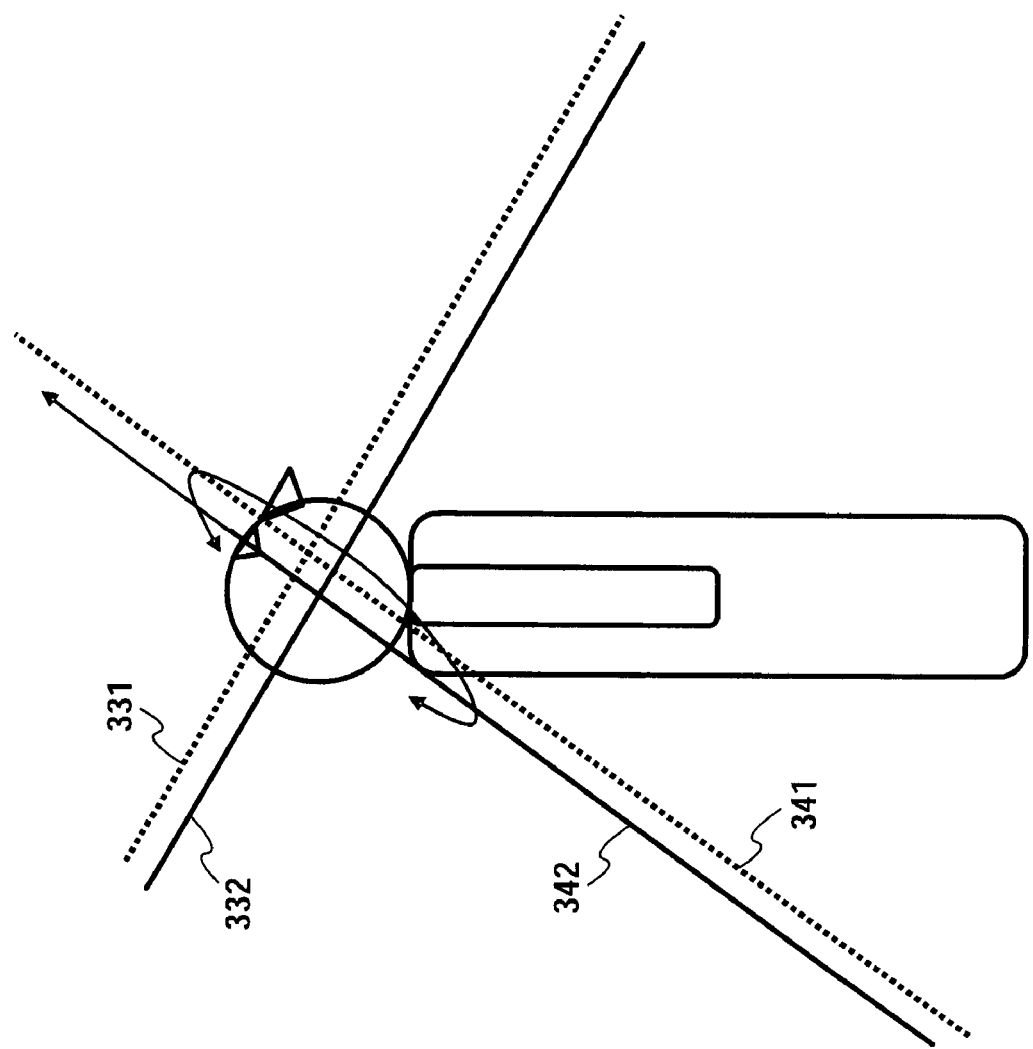
FIG. 7 is an explanatory drawing showing an example of the relationship between a face rotation axis and line of sight rotation axis according to Embodiment 1 of the present invention.

FIG. 7 is an explanatory drawing showing an example of a case in which face rotation axis 331 and eyeball rotation axis 332 are parallel, together with face displacement plane 341 and eyeball displacement plane 342. As is clear from FIG. 7, in step S209 in FIG. 2 it is determined whether or not face rotation axis 331 and eyeball rotation axis 332 are parallel regardless of the body rotation axis.

In step S211 in FIG. 2, since face rotation axis 331 and eyeball rotation axis 332 are parallel, attention state determination section 105 next determines from head displacement 324 and eyeball displacement 325 whether or not the dwell time in the same direction for each displacement is a preset threshold time.

Here, "in the same direction" means that when a clockwise displacement relative to body direction 311 is deemed to be positive for a displacement between the head direction and body direction (head displacement) 324, and a clockwise displacement relative to face direction 312 is deemed to be positive for a displacement between the line of sight direction and face direction (eyeball displacement) 325, displacement 324 between the face direction and body direction and displacement 325 between the line of sight direction and face direction have the same sign (positive and positive, negative and negative), and the same definition applies hereinafter).

If, according to head displacement 324 and eyeball displacement 325, the dwell time in the same direction for each displacement has not reached the preset threshold time (step S211: NO), the processing flow proceeds to step S212, and attention state determination section 105 determines non-attention.

The preset threshold value is a short time between approximately 0.1 second and approximately one second, but is not limited to this range and may be varied dynamically, with a longer time being set, for example, when the surrounding environment is dark.

On the other hand, if, according to head displacement 324 and eyeball displacement 325, the dwell time in the same direction for each displacement has reached the preset threshold time (step S211: YES), the processing flow proceeds to step S213.

In step S213, since the dwell time has reached the threshold time, attention state determination section 105 next performs determination of one of the three states "1. attention, 2. glance, 3. non-attention" by referencing the attention determination conditions stored in attention state database 104 using head displacement 324 and eyeball displacement 325 or displacement ratio information, and outputs the determination result to information acquisition section 108.

The following attention determination conditions are stored in attention state database 104 beforehand.

There are a total of three attention determination conditions, and an attention state can be determined according to how history (past displacement ratio information) and displacement ratio information currently being processed satisfy these attention determination conditions.

In the following description, a face direction is face direction 312 relative to body direction 311 in FIG. 4, and a line of sight direction is a line of sight direction 313 relative to face direction 312 in FIG. 4.

FIG. 8 is a drawing showing face direction and line of sight direction displacement time variation patterns as actual examples of displacement ratio information conforming to the respective attention determination conditions. Below, the degree to which attention state determination section 105 uses past displacement ratio information when performing attention determination condition referencing varies according to the characteristics shown in FIG. 8A through FIG. 8D.

Figure 8B:
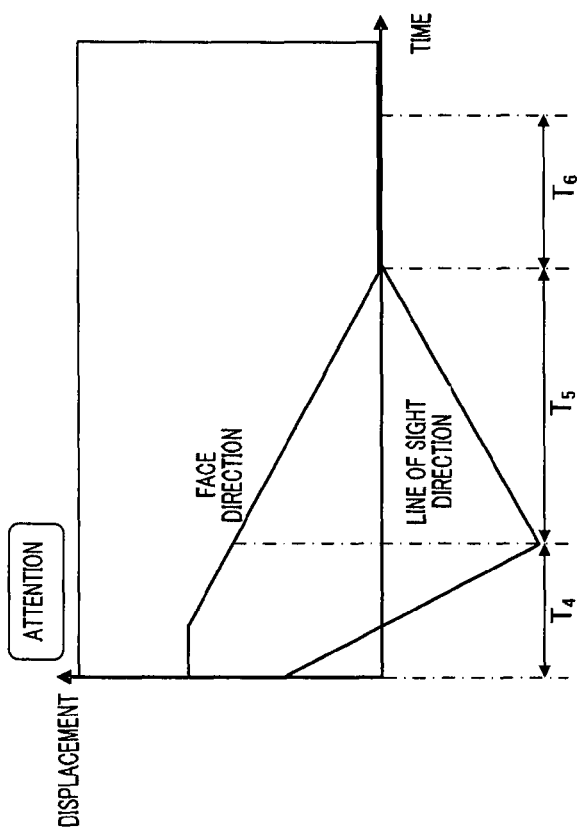
FIG. 8 is an explanatory drawing showing examples of face direction and line of sight direction displacement time variation patterns conforming to various attention determination conditions according to Embodiment 1 of the present invention.

For example, in order to perform determination with the characteristics in FIG. 8B, a certain degree of past displacement ratio information is deemed to be necessary.

Figure 8D:
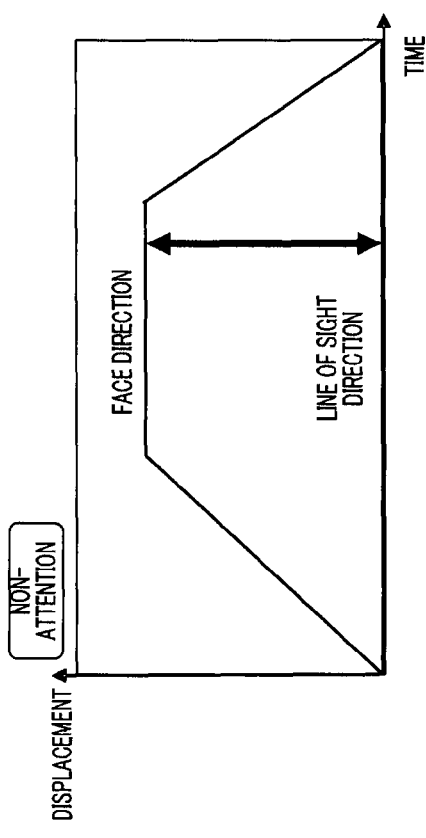
Figure 8A:
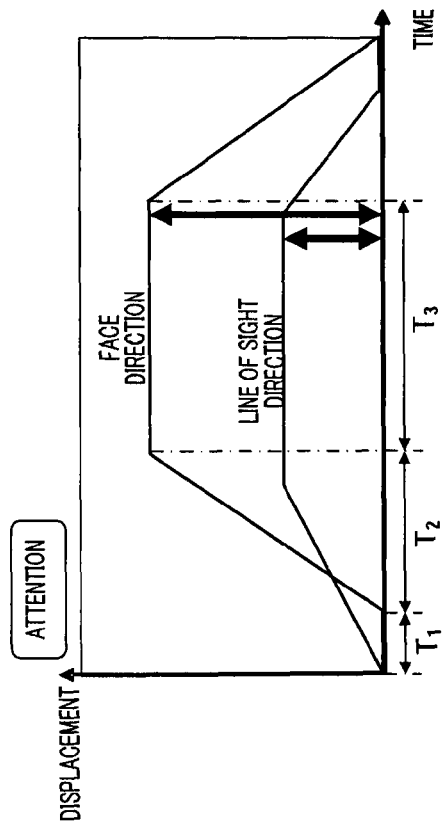

Attention determination condition 1 is that the displacement ratio satisfies the relationship 2:1 as shown in FIG. 8A. In the case of attention determination condition 1, the displacement ratio satisfies the relationship 2:1 as shown in FIG. 8A.

However, the ratio need not be exactly 2:1, but may be $2\pm\beta:1\pm\gamma$ (where $\beta$ and $\gamma$ are arbitrary positive numbers).

Attention determination condition 2 is that, as shown in FIG. 8B, when viewing head displacement 324 history, is a state in which displacement is restored to displacement 0—that is, a straight-ahead face direction—from a certain state, and when viewing eyeball displacement 325 history, is a state in which head displacement 324 decreases before becoming 0, and after reaching a negative direction, displacement 0—that is, a face-front eye direction—is restored.

Figure 8C:
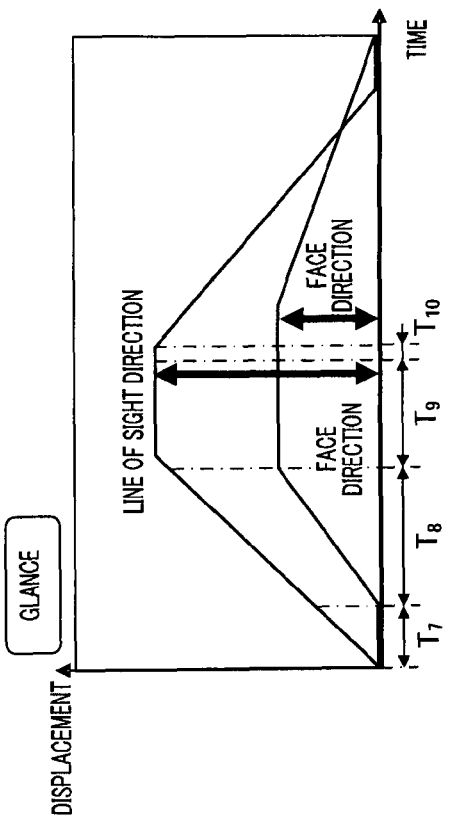

Attention determination condition 3 is that, as shown in FIG. 8C, eyeball displacement 325 is greater than head displacement 324, and the dwell time in the same direction of head displacement 324 and eyeball displacement 325 is less than or equal to a preset time. If head displacement 324 and eyeball displacement 325 are both small (for example, less than 10 degrees), a non-attention state is determined.

"Attention", "non-attention", or "glance" is determined by a combination of the above attention determination conditions.

The state when either above attention determination condition 1 or attention determination condition 2 is satisfied is the attention state.

The state when above attention determination condition 3 is the glance state.

The state when none of above attention determination conditions 1 through 3 applies is the non-attention state, as shown in FIG. 8D.

Attention determination condition 1 is the attention determination condition when attention is being paid other than straight ahead, and attention determination condition 2 is the attention determination condition when attention is paid straight ahead from a state in which the head or an eyeball is directed other than to the front of the body.

It is possible for attention determination in step S213 to be implemented by, for example, executing in parallel first attention state determination processing that determines whether or not above attention determination condition 1 is satisfied, second attention state determination processing that determines whether or not above attention determination condition 2 is satisfied, and third attention state determination processing that determines whether or not above attention determination condition 3 is satisfied.

Examples of these kinds of processing will now be described using the accompanying drawings. Here, attention state determination section 105 is assumed to set a head displacement flag Fh that has a value of 0 when the head displacement value is 0 and has a value of 1 when the head displacement value is another value, and an eyeball displacement flag Fe that has a value of 0 when the eyeball displacement value is 0 and has a value of 1 when the eyeball displacement value is another value. Also, attention state determination section 105 holds an input head displacement, eyeball displacement, and displacement ratio X=eyeball displacement/head displacement indicated by displacement ratio information, and the value of head displacement flag Fh and the value of eyeball displacement flag Fe set based on input information, for at least time $T_0$, and performs referencing as appropriate in the respective above processing.

Figure 9:
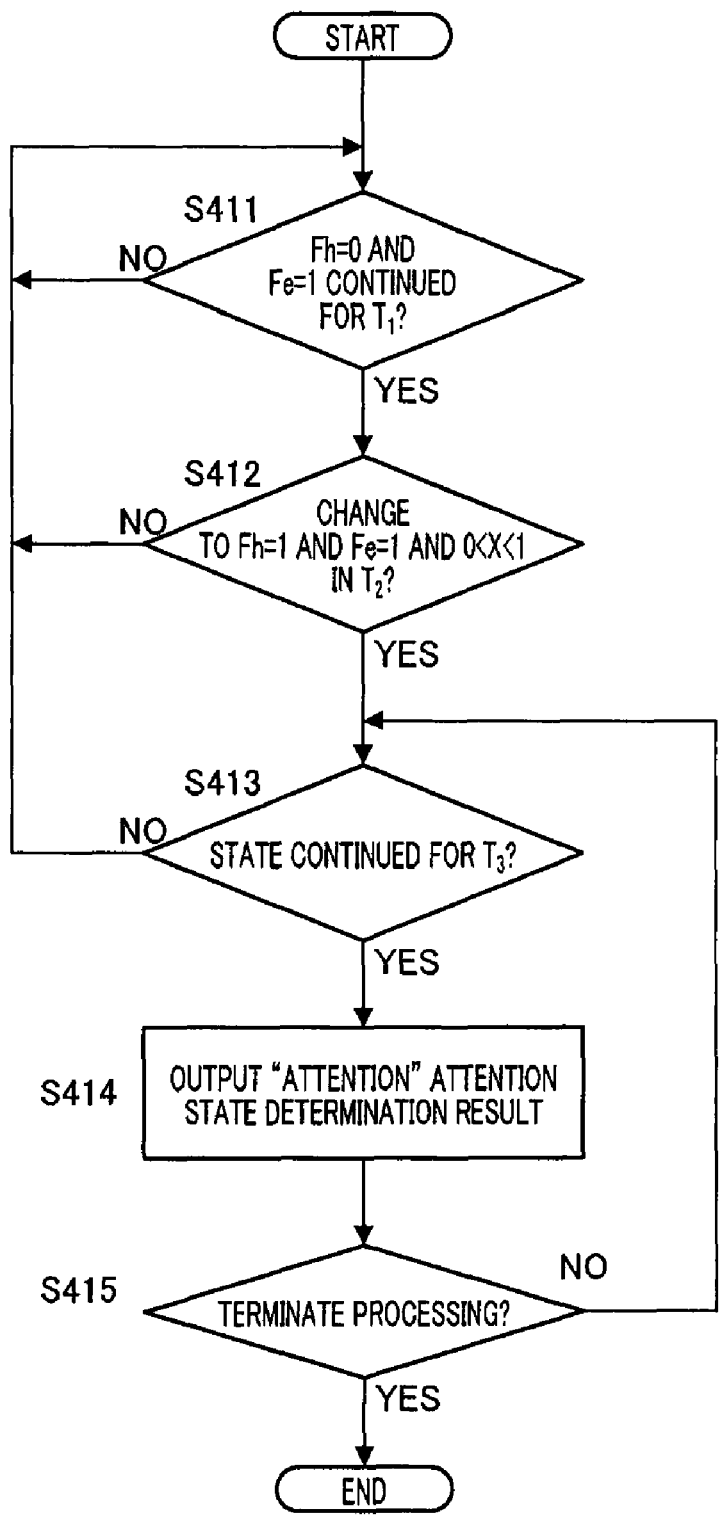
FIG. 9 is a flowchart showing an example of the flow of first attention state determination processing by an attention state determination section according to Embodiment 1 of the present invention.

FIG. 9 is a flowchart showing an example of the flow of first attention state determination processing by attention state determination section 105.

In step S411, attention state determination section 105 determines whether or not a state in which head displacement flag Fh=0 and eyeball displacement flag Fe=1 has continued for preset time $T_1$. If the above state has continued (S411: YES), the processing flow proceeds to step S412, whereas if the above state has not continued or if the above state has not been established (S411: NO), step S411 state monitoring is continued.

In step S412, attention state determination section 105 determines whether or not a change has been made in preset time $T_2$ to a state in which head displacement flag Fh=1, eyeball displacement flag Fe=1, displacement ratio X>0, and displacement ratio X<1, while displacement ratio X>0 is maintained. If the above change has occurred (S412: YES), the processing flow proceeds to step S413, whereas if the above change has not occurred or if displacement ratio X<0 (S412: NO), the processing flow returns to step S411. If the condition $2\pm\beta:1\pm\gamma$ is applied to displacement ratio X as described above, determination of whether or not displacement ratio X has become a value that satisfies condition $2\pm\beta:1\pm\gamma$ within a predetermined time is further added to the determination conditions.

In step S413, attention state determination section 105 determines whether or not a state in which head displacement and eyeball displacement are the same has continued for preset time $T_3$. If the above state has continued (S413: YES), the processing flow proceeds to step S414, whereas if the above state has not continued (S413: NO), the processing flow returns to step S411.

In step S414, attention state determination section 105 determines that only the line of sight was directed toward the target object in time $T_1$, the face moved in line with the line of sight in following time $T_2$, and furthermore the line of sight and face continued to be directed toward the target object in following time $T_3$, and outputs an "attention" attention state determination result.

Then, in step S415, attention state determination section 105 determines whether or not to terminate processing that determines whether or not attention determination condition 1 is satisfied, and if this processing is to be continued (S415: NO), returns to step S413, or if this processing is to be terminated (S415: YES), terminates the series of processing steps. Times $T_1$ through $T_3$ correspond respectively to the symbol $T_1$ through $T_3$ intervals shown in FIG. 8A, for example.

Figure 10:
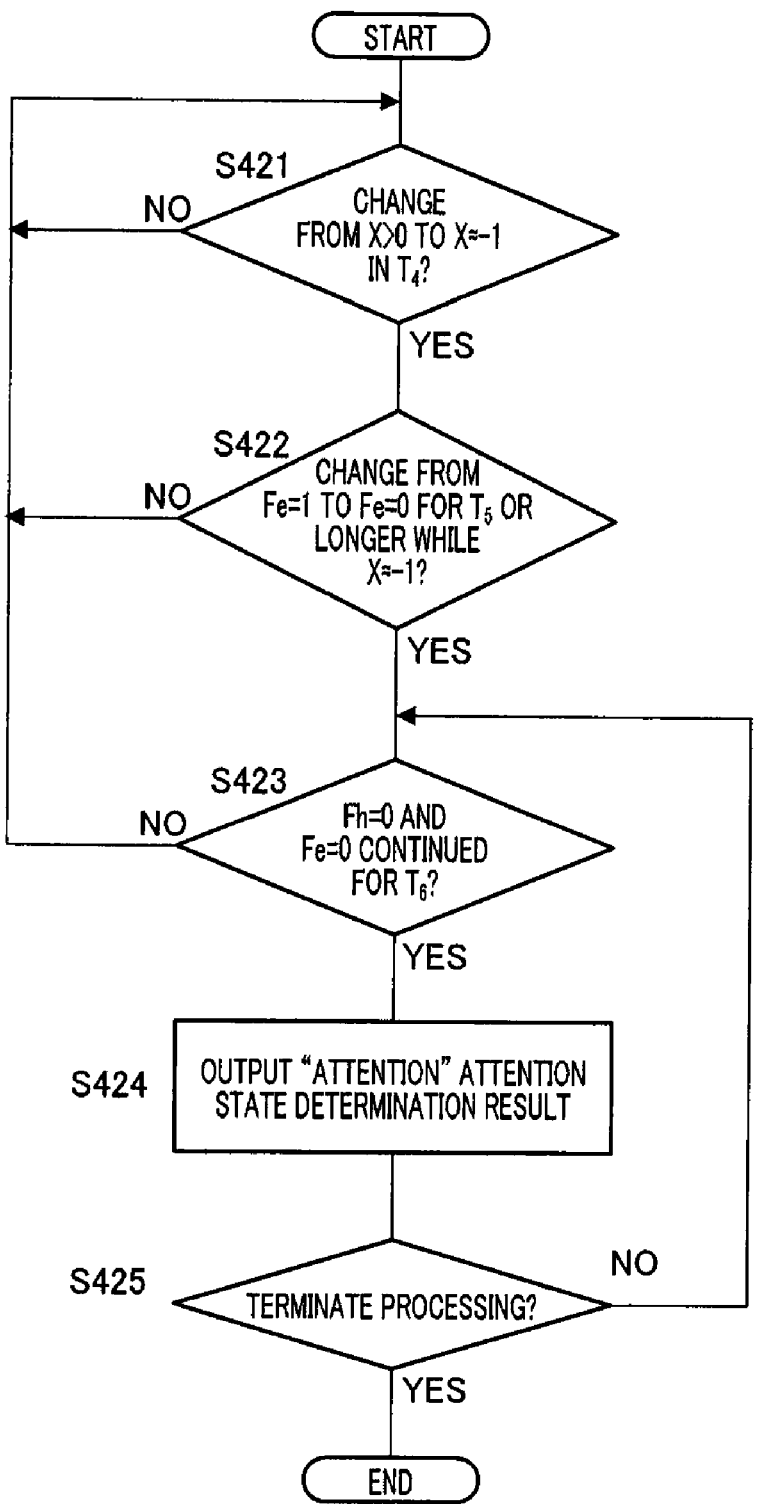
FIG. 10 is a flowchart showing an example of the flow of second attention state determination processing by an attention state determination section according to Embodiment 1 of the present invention.

FIG. 10 is a flowchart showing an example of the flow of processing by attention state determination section 105 that determines whether or not attention determination condition 2 is satisfied.

In step S421, attention state determination section 105 determines whether or not a change has been made from a state in which displacement ratio X>0 to a state in which displacement ratio X≈−1 in preset time $T_4$. If the above change has occurred (S421: YES), the processing flow proceeds to step S422, whereas if the above change has not occurred or if displacement ratio X>0 (S421: NO), step S421 state monitoring is continued.

In step S422, attention state determination section 105 determines whether or not a change has been made from a state in which eyeball displacement flag Fe=1 to a state in which eyeball displacement flag Fe=0 for preset time $T_5$ or longer while displacement ratio X≈−1 is maintained. If the above change has occurred for time $T_5$ or longer (S422: YES), the processing flow proceeds to step S423, whereas if the above change has occurred for less than preset time $T_5$ or if X≈−1 no longer holds true (S422: NO), the processing flow returns to step S421.

In step S423, attention state determination section 105 determines whether or not a state in which head displacement flag Fh=0 and eyeball displacement flag Fe=0 has continued for preset time $T_6$. If the above state has continued (S423: YES), the processing flow proceeds to step S424, whereas if the above state has not continued (S423: NO), the processing flow returns to step S421.

In step S424, attention state determination section 105 determines that, of the line of sight and face directed toward the target object, the line of sight was directed forward first in time $T_4$, in following time $T_5$ the face that was directed toward the target object was directed forward slowly so as not to disturb the line of sight in line with the line of sight, and furthermore the line of sight and face continued to be directed forward in following time $T_6$, and outputs an "attention" attention state determination result.

Then, in step S425, attention state determination section 105 determines whether or not to terminate processing that determines whether or not attention determination condition 2 is satisfied, and if this processing is to be continued (S425: NO), returns to step S423, or if this processing is to be terminated (S425: YES), terminates the series of processing steps.

Times $T_4$ through $T_6$ correspond respectively to the symbol $T_4$ through $T_6$ intervals shown in FIG. 8B, for example.

Figure 11:
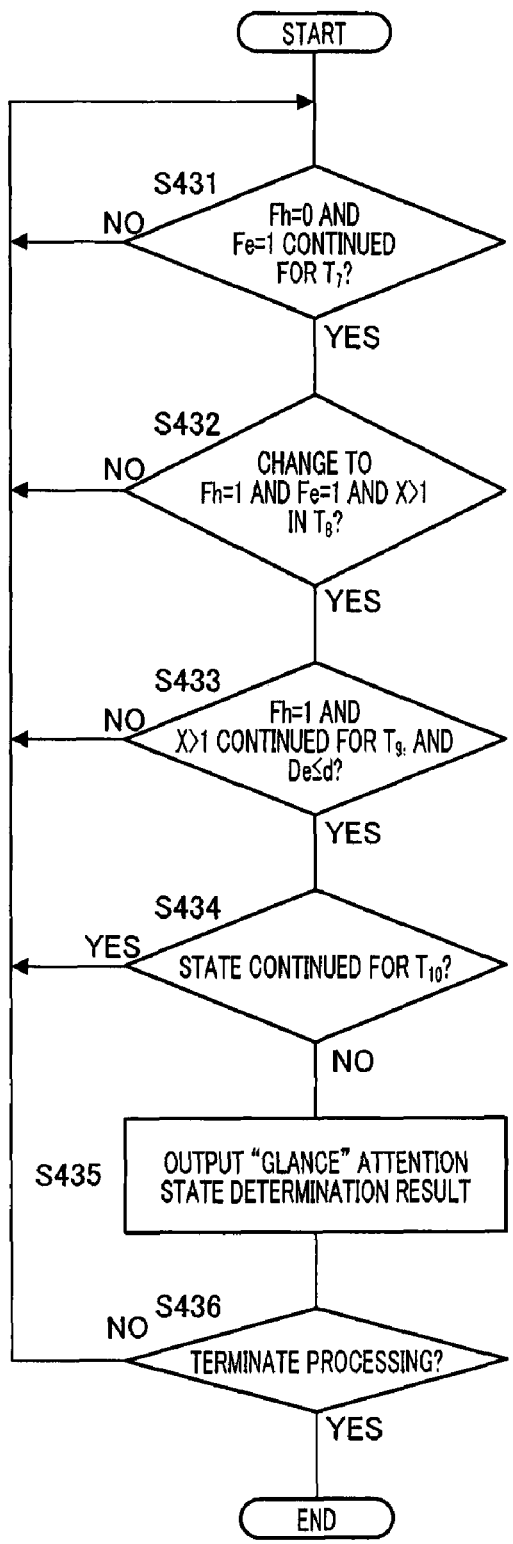
FIG. 11 is a flowchart showing an example of the flow of third attention state determination processing by an attention state determination section according to Embodiment 1 of the present invention.

FIG. 11 is a flowchart showing an example of the flow of third attention state determination processing by attention state determination section 105.

In step S431, attention state determination section 105 determines whether or not a state in which head displacement flag Fh=0 and eyeball displacement flag Fe=1 has continued for preset time $T_7$. If the above state has continued (S431: YES), the processing flow proceeds to step S432, whereas if the above state has not continued or if the above state has not been established (S431: NO), step S431 state monitoring is continued.

In step S432, attention state determination section 105 determines whether or not a change has been made in preset time $T_8$ to a state in which head displacement flag Fh=1, eyeball displacement flag Fe=1, and displacement ratio X>1. If the above change has occurred (S432: YES), the processing flow proceeds to step S433, whereas if the above change has not occurred or if a change has been made to a state other than the above state (S432: NO), the processing flow returns to step S431.

In step S433, attention state determination section 105 determines whether or not a state in which head displacement flag Fh=1 and displacement ratio X>1 has continued for preset time $T_9$, and amount of change De of eyeball displacement in this time $T_9$ is less than or equal to preset threshold value d. If the above state has continued and amount of change De is less than or equal to threshold value d (S433: YES), the processing flow proceeds to step S434, whereas if the above state has not continued or if amount of change De exceeds threshold value d, or if the above state has not been established, (S433: NO), the processing flow returns to step S431.

In step S434, attention state determination section 105 determines whether or not a state in which head displacement and eyeball displacement are the same has continued for preset time $T_{10}$. If the above state has not continued and a change has been made to another state (S434: NO), the processing flow proceeds to step S435, whereas if the above state has continued (S434: YES), the processing flow returns to step S431.

In step S435, attention state determination section 105 determines that only the line of sight was directed toward the target object in time $T_7$, the face moved in line with the line of sight in following time $T_8$, the line of sight and face continued to be directed toward the target object in following time $T_9$, but did not continue for following time $T_{10}$ or longer, and outputs a "glance" attention state determination result.

Then, in step S436, attention state determination section 105 determines whether or not to terminate processing that determines whether or not attention determination condition 3 is satisfied, and if this processing is to be continued (S436: NO), returns to step S431, or if this processing is to be terminated (S436: YES), terminates the series of processing steps. Times $T_7$ through $T_{10}$ correspond respectively to the symbol $T_7$ through $T_{10}$ intervals shown in FIG. 8C, for example. When a return is made from step S434 to step S431—that is, if a state in which the line of sight and face are continuously directed toward the target object continues for time $T_{10}$ or longer—an "attention" attention state determination result may be output.

Thus, by executing first through third attention state determination processing, attention state determination section 105 can output an "attention" attention state determination result when either attention determination condition 1 or 2 is satisfied, and a "glance" attention state determination result when attention determination condition 3 is satisfied. For times $T_1$ through $T_{10}$, empirical values, or values based on measured values for the duration of various states when a person is actually placed in each attention state, can be stored beforehand in attention state database 104. Although attention state determination section 105 executes first through third attention state determination processing, it can simply output a "non-attention" attention state determination result if it does not output an "attention" or "glance" attention state determination result.

If, for example, a person blinks or conceals his face with a hand, image input section 101 may not be able to detect face area 302 or the position of facial parts from image 300, and face and eye displacement detection may fail. In such a case, there is a possibility of an incorrect determination being made.

In a case such as this, it is possible to reduce the effect on determination of an above-described detection error by noting that the displacement ratio between head displacement 324 and eyeball displacement 325 varies greatly between the previous input and the present input, and taking the following countermeasures, for example.

Each time displacement ratio information is input, attention state determination section 105 determines whether or not the absolute value of the difference between the displacement ratio indicated by the input displacement ratio information and the displacement ratio indicated by the previously input displacement ratio information is greater than or equal to an upper limit determined by the normal speed of movement of a human being. If the absolute value of the difference between the displacement ratios is greater than or equal to the upper limit, the input displacement ratio this time is determined to contain a detection error, and the displacement ratio input the previous time is used instead of the displacement ratio input this time.

If the displacement ratio detection interval is sufficiently short, displacement ratios will seldom vary greatly. Therefore, normally, even if the previously input displacement ratio is used, the same attention state determination result can be obtained as if the original displacement ratio were used. Alternatively, the original displacement ratio may be estimated by linear interpolation or nonlinear interpolation from the history of past displacement ratio detection results, and the estimated value may be used.

Another alternative is for attention state determination section 105 not to perform attention state determination if there is a change in the displacement ratio greater than or equal to a preset value. In this case, provision can be made for information indicating "determination not possible" to be output to information acquisition section 108, and for information acquisition section 108, upon input of this information, to notify the user that attention state determination is not possible.

However, a case may also occur in which information that is actually correct is erroneously determined to be based on a detection error for some reason, such as when the above-described upper limit has been set incorrectly, for example. Therefore, displacement ratio information for which there is a possibility of this kind of detection error may be stored, further analysis as to whether or not there is a detection error performed on the basis of an accumulated plurality of displacement ratio information items, and information for which there is no detection error used for determination as valid information. The above countermeasures can be applied to both head displacement and eyeball displacement.

In most cases, head displacement, eyeball displacement, displacement ratio, and suchlike detection results will include a minute error. Therefore, attention state determination section 105 may, for example, smooth detection results by calculating a moving average of a plurality of past detection results, and use the smoothed detection result. By this means, the effect of a minute error in detection results is minimized, the effect of detection errors is minimized, and the robustness of attention level determination accuracy can be improved. A weighted average may be used instead of a moving average, in which case tracking of the latest detection results can be improved.

In step S214 in FIG. 2, if the determination result output by attention state determination section 105 is an "attention" state, information acquisition section 108 detects the line of sight direction from head displacement 324 and eyeball displacement 325, reads an RFID tag attached to an object in that direction, acquires information relating to that object from RFID database 109, stores the time at which attention was paid, and/or RFID tag information, and/or information acquired from RFID database 109, in information storage section 110, and also outputs this information to presentation section 111.

If the determination result output by attention state determination section 105 is a "glance" state, information is acquired from RFID database 109 in the same way as in the case of "attention" state processing, and this is stored in information storage section 110.

The information stored at this time is not output to information presentation section 111, but if, after storage, the user requests presentation of the stored information, the information is read from information storage section 110 and output to information presentation section 111.

RFID database 109 stores information on an RFID tag attached to an object to which attention is paid or that is glanced at, and detailed information relating thereto, in mutually associated form.

Information storage section 110 stores and accumulates presentation information output by information acquisition section 108.

In step S215, information presentation section 111 takes presentation information output from information acquisition section 108 as input, and presents it via a display device or audio device such as a cathode ray tube, liquid crystal display, plasma display, organic EL display, speaker, or the like.

Such real-time provision by information presentation section 111 of information relating to an object to which attention is being paid while driving can help a driver to understand the situation and concentrate on his driving, and thus improve safety.

For example, when a signboard for a resort facility or the like is spotted while driving, parking may be difficult because of the road conditions, and it may be necessary to look at the signboard while continuing to drive.

If image processing apparatus 100 of this embodiment is used in a case of this kind, the driver's state is determined to be an "attention" state, information on the object of interest (in this case, the content of the signboard) is acquired, and that content can be presented immediately as an audible announcement.

By this means, the driver is able to acquire the relevant information without continuously looking at the signboard, and can concentrate his visual attention on an understanding of the road conditions.

In step S216, image processing apparatus 100 of this embodiment terminates its operation. Alternatively, image processing apparatus 100 may return to the processing starting point. Thus, image processing apparatus 100 performs attention state determination and also presents a driver with appropriate information according to the determination result.

In attention state determination, a displacement difference in head and eye directions may be used instead of, or together with, the above-described displacement ratio. In this case, attention state database 104 stores attention determination conditions corresponding to above displacement difference time variation patterns, displacement detection section 103 acquires a difference between head displacement 324 and eyeball displacement 325 and outputs this to attention state determination section 105 as displacement difference information, and attention state determination section 105 performs attention state determination based on the displacement difference information.

If a displacement difference is used, it can be determined, for example, whether or not the difference resulting from subtracting the absolute value of head displacement from the absolute value of eyeball displacement (hereinafter referred to as "displacement difference") maintains a state equivalent to a state shown in FIG. 8A through FIG. 8C. However, exact equivalence is not necessary, and attention determination condition 1 may be deemed to be satisfied if the result is within a preset error range.

Specifically, for example, for attention determination condition 1, first attention state determination processing shown in FIG. 9 may be executed with the condition "displacement ratio X>0 and displacement ratio X<1" in step S412 replaced by a condition "displacement ratio X<0". For attention determination condition 2, second attention state determination processing shown in FIG. 10 may be executed with the condition "a change has been made from a state in which displacement ratio X>0 to a state in which displacement ratio X≈−1" in step S421 replaced by a condition "a change is made until the eyeball displacement sign changes and the displacement difference is 0", and the condition "while displacement ratio X≈−1 is maintained" replaced by a condition "while displacement difference≈0 is maintained". And for attention determination condition 3, third attention state determination processing shown in FIG. 11 may be executed with the condition "displacement ratio X>1" in steps S432 and S433 replaced by a condition "displacement difference>0".

If the value of one or both of head displacement 324 and/or eyeball displacement 325 is 0, the displacement difference method can be implemented more easily than the displacement ratio method. Therefore, by using a displacement difference, the attention state determination processing algorithm can be simplified, and the development efficiency and operating speed of image processing apparatus 100 can be improved.

As described above, according to this embodiment, determination of the attention level of a person toward a predetermined object is performed, from an input image, from displacement of the face direction with respect to the front and displacement of the line of sight direction with respect to the front of the face. That is to say, an attention level can be determined according to the correlation of a plurality of body region movements, erroneous operation can be reduced compared with a case in which only information on a single body region-namely, the face direction—is used, and stable attention level determination is possible. Also, since attention level determination is performed based on a time variation pattern of face direction and line of sight direction displacement, attention level determination with improved reliability can be implemented.

In this embodiment, attention states are classified into three states, but values with these as three or more, less than three, or consecutive values, may also be used as attention levels. For example, a case in which an "attention state" condition is satisfied and that state is maintained for a long period may be defined as a "highest attention state", and determination of four states including this may be performed.

At this time, an attention state database 104 conforming to the classified types is newly constructed.

If an object to which attention is being paid while driving is obtained as the result of attention level determination, real-time provision of information relating to that object to which attention is being paid can help the driver to understand the situation and concentrate on his driving, and thus improve safety.

Also, by accumulating not all information but only information on an object to which attention is paid or that is glanced at, retrieval capability can be improved when the user wants to reconfirm information, and the burden on the user can be reduced.

For example, if a driver sees a signboard displaying traffic congestion information, but after driving past the signboard forgets the displayed distance to the congestion and wants to check it again immediately, use of image processing apparatus 100 of this embodiment enables the driver to retrieve the signboard information easily, and check the distance to the congestion by means of a quick operation.

Furthermore, differentiating between "paying attention" and "glancing" makes it possible not to provide information relating to an object—such as one only glanced at—for which detailed information is determined to be unnecessary, sparing the user the annoyance of receiving unwanted information.

For example, when a signboard announcing nighttime road construction work is seen, if the signboard is seen on a road used only in the daytime, detailed information is unnecessary, and therefore in most cases the signboard is only glanced at, but if the signboard is seen on a road also used at night, detailed information is necessary, and therefore in most cases attention is paid to the signboard.

However, having the content of the signboard announced on every occasion, not only when attention is paid but also when only a glance is given, is annoying for a driver.

If image processing apparatus 100 of this embodiment is used it is possible to differentiate between "paying attention" and "glancing", and in the case of a glance, only information storage is performed and no announcement is made.

This spares the driver a sense of annoyance and enables him to drive more safely as a result.

Moreover, checking the correlation of displacements of movements of a plurality of body regions enables the robustness of attention level determination accuracy to be improved.

In this embodiment, a car navigation system has been described by way of example, but other possible applications include an information presentation device such as a TV or speaker, a safety state monitoring device such as a vehicle-mounted camera or surveillance camera, an image recording device such as a still camera or video camera, a life supporting device such as a robot, and an amusement device such as a TV game or sensory video game machine.

Application of the invention of the present application, including this embodiment, to an above-described device enables an attention level to be measured stably without measuring the pulse, perspiration, or brainwaves, as with the conventional technology, and thus has an effect of enabling the configuration of a device to be simplified, and construction costs to be reduced.

In this case, implementation is possible by replacing information acquisition section 108, RFID database 109, information storage section 110, and information presentation section 111 of this embodiment with an image recording section for recording an input image, a peripheral information capturing section whereby a robot grasps the situation of a user, the robot, etc., a state updating section for changing the state of a game, and so forth.

Embodiment 2

This embodiment is an information provision apparatus that performs attention determination appropriate to an individual's physical characteristics and habits by prior construction through learning of an attention determination database of an image processing apparatus of Embodiment 1, and performs information provision based thereon.

Figure 12:
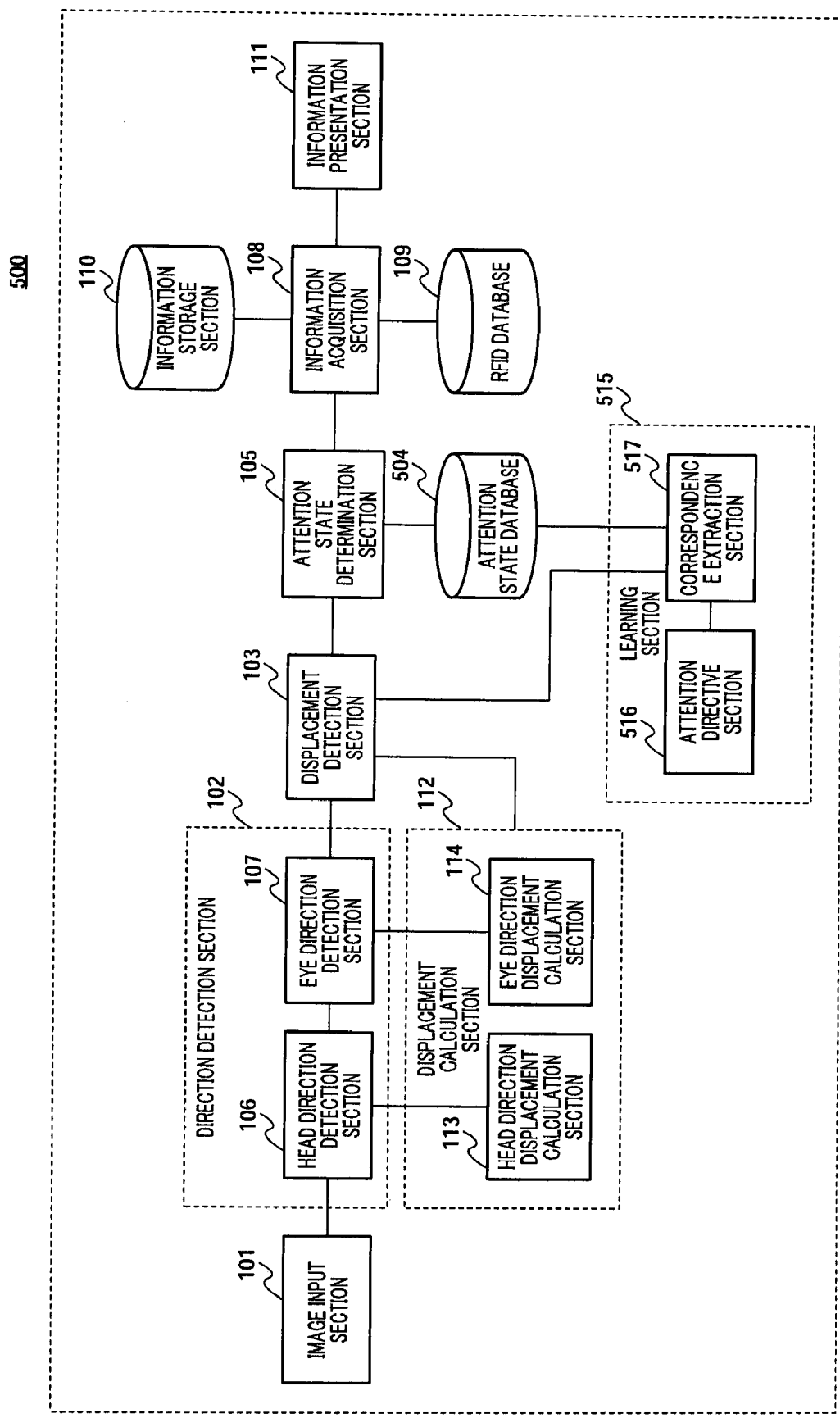
FIG. 12 is a block diagram showing the configuration of an image processing apparatus according to Embodiment 2 of the present invention.

FIG. 12 is a block diagram showing the configuration of an image processing apparatus of the present invention included in an information provision apparatus according to Embodiment 2 of the present invention, and corresponds to FIG. 1 of Embodiment 1.

Image processing apparatus 500 has, in addition to configuration elements of Embodiment 1, attention directive section 516, correspondence extraction section 517, and attention state database 504. Attention directive section 516 gives a directive concerning an object of interest and the degree of attention to a test subject, and outputs a degree of attention to correspondence extraction section 517 as directive information. Correspondence extraction section 517 associates displacement detection section 103 output with attention directive section 516 output, and outputs the result to attention state database 504. Attention state database 504 stores correspondence extraction section 517 output.

Above-described attention directive section 516 and correspondence extraction section 517 are collectively designated learning section 515. Learning section 515 learns attention determination conditions used by attention state determination section 105.

Image input section 101, direction detection section 102, displacement detection section 103, attention state determination section 105, information acquisition section 108, RFID database 109, information storage section 110, and information presentation section 111 are the same as in Embodiment 1, and descriptions thereof are omitted here.

A learning operation of attention state database 504 of this embodiment will now be described.

Figure 13:
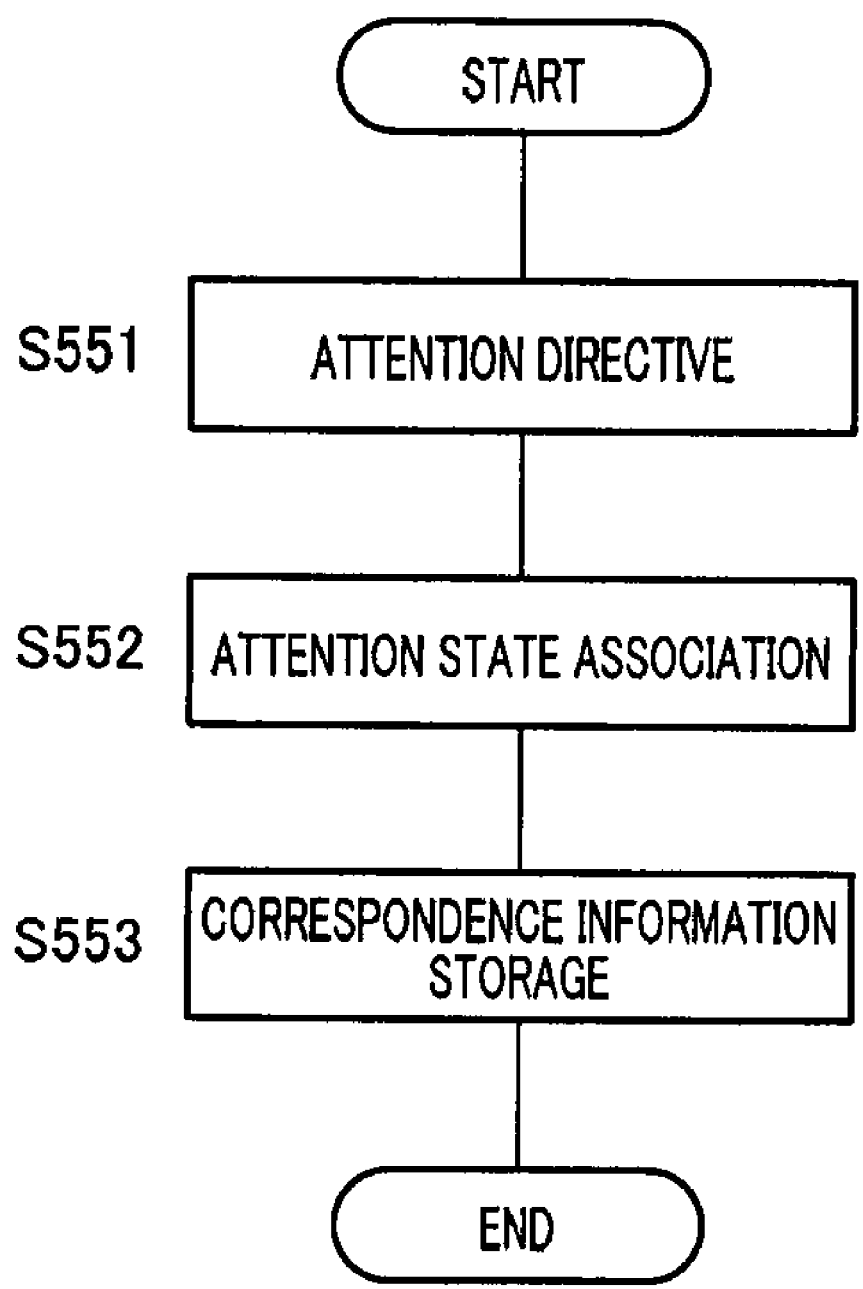
FIG. 13 is a flowchart showing the flow of learning processing of an image processing apparatus according to Embodiment 2 of the present invention.

FIG. 13 is a flowchart showing the operating flow of image processing apparatus 500 having the configuration of the invention shown in above-described FIG. 12.

In step S551, attention directive section 516 shows an object to a test subject, gives a directive to view the object in three states—1. attention, 2. non-attention, 3. glance (line of sight movement not particularly attempting to view the object)—and outputs the directive content to correspondence extraction section 517.

As the directive method, when asking for attention to be paid, the directive "Look until you can describe the viewed object in detail later" is given to the test subject. When asking for a glance to be given, the test subject is directed to look only for an extremely short time, and is then given the directive "Look so as to be able to be able to name the viewed object later", or told beforehand "You will be asked later to make a simple sketch of the viewed object." When asking for attention to be paid, an object of complex shape or pattern may be shown, and when asking for a glance to be given, an object of simple shape or pattern, such as a triangle or circle, may be shown.

In step S552, correspondence extraction section 517 mutually associates attention directive section 516 directive content, head direction displacement calculation section 113 output since the directive, eye direction displacement calculation section 114 output, and displacement detection section 103 output, and outputs that correspondence information to attention state database 504. That is to say, a state corresponding to the directive content from among "1. attention, 2. glance, 3. non-attention", and a detected head displacement, eyeball displacement, and displacement ratio, are mutually associated (assigned mutual correspondence).

Specifically, for example, correspondence extraction section 517 measures times corresponding to times $T_1$ through $T_{10}$ described in FIG. 9 through FIG. 11, and the amount of change of eyeball displacement in the time corresponding to time $T_9$. Then times $T_1$ through $T_9$ and threshold value d are determined from the measured times and eyeball displacement amount of change. At this time, measurement may be performed a plurality of times and times $T_1$ through $T_{10}$ and threshold value d determined from the average and distribution of the measured values. Also, correspondence extraction section 517 may generate above-described correspondence information associated with the direction of the object of interest—that is, the line of sight direction of the test subject. Furthermore, eyeball displacement fluctuation and/or head displacement fluctuation when the test subject is paying attention to a certain object may be learned as one of the characteristics when the test subject is paying attention.

In step S553, attention state database 504 stores correspondence information output by correspondence extraction section 517.

Next, the operation when attention state determination according to this embodiment is performed will be described. Image processing apparatus 500 of this embodiment performs the same kind of operation as in FIG. 2 of Embodiment 1, but part of the attention state determination processing by attention state determination section 105 in step S213 differs from that in Embodiment 1.

In step S213 in FIG. 2, attention state database 504 outputs the nearest state among input head direction displacement calculation section 113 output, eye direction displacement calculation section 114 output, and displacement detection section 103 output, as the state at that time. Here, "the nearest state" means, for example, the state for which the sum of absolute values of differences between a head displacement, eyeball displacement, and displacement ratio detected as attention state determination objects, and a head displacement, eyeball displacement, and displacement ratio obtained in the learning stage, are minimal. At this time, the absolute value of difference in each of head displacement, eyeball displacement, and displacement ratio may be weighted.

Also, a template pattern of each state may be created and the state with the smallest distance output by means of dynamic programming, or a stochastic model of a corresponding state may be generated from correspondence extraction section 517 output, and the state with the highest occurrence probability output using an HMM (Hidden Markov Model).

Also, when times $T_1$ through $T_{10}$ and threshold value d described in FIG. 9 through FIG. 11 are stored in attention state database 504 in the learning stage as described above, attention state determination section 105 can reference attention state database 504 and execute first through third attention state determination processing shown in FIG. 9 through FIG. 11. Moreover, when above-described correspondence information is associated with the line of sight direction of a test subject, attention state database 504 can determine the line of sight direction of a person subject to determination from head displacement and eyeball displacement, and reference the corresponding correspondence information. Furthermore, when eyeball displacement fluctuation and head displacement fluctuation when a test subject is paying attention to an object are learned, attention state determination section 105 can reference attention state database 504 and output an "attention" attention state determination result when the eyeball displacement fluctuation and head displacement fluctuation of a person subject to determination are similar to the learning result.

As described above, according to this embodiment, optimal information can be provided to a person by performing attention determination appropriate to an individual's physical characteristics and habits and performing information provision based thereon. Also, learning is performed for each individual, enabling determination accuracy to be improved.

Embodiment 3

In this embodiment, an image processing apparatus of the present invention is applied to a warning system that determines whether or not a driver is paying attention to a door mirror and/or rear-view mirror while driving, and issues a warning as necessary, in order to prevent accidents due to driver inattention or oversight.

Figure 14:
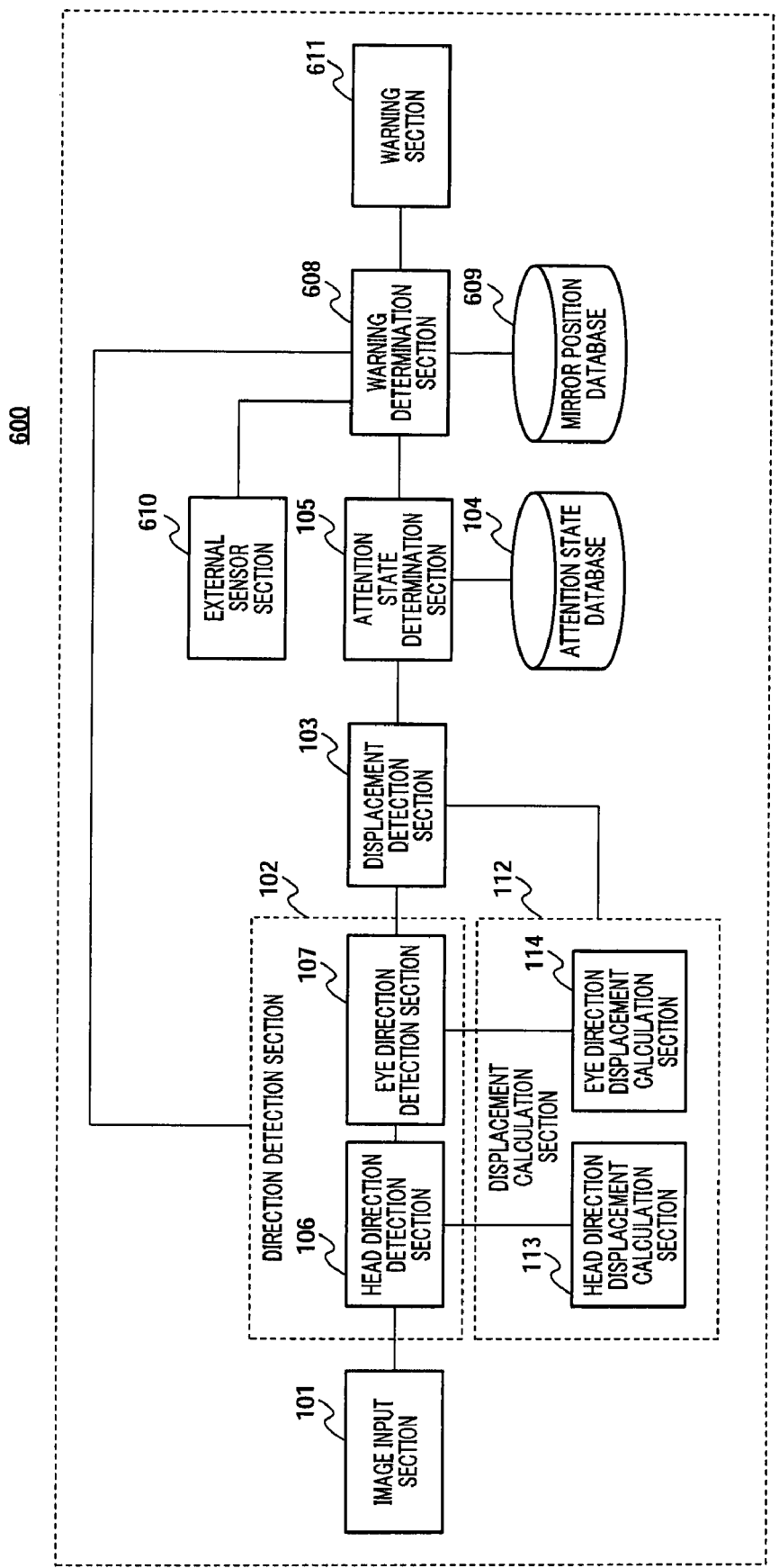
FIG. 14 is a block diagram showing the configuration of an image processing apparatus according to Embodiment 3 of the present invention.

FIG. 14 is a block diagram showing the configuration of an image processing apparatus according to Embodiment 3 of the present invention, and corresponds to FIG. 1 of Embodiment 1. Parts identical to those in FIG. 1 are assigned the same reference codes as in FIG. 1, and descriptions thereof are omitted here.

Image processing apparatus 600 has, in addition to configuration elements of Embodiment 1, warning determination section 608, mirror position database 609, external sensor section 610, and warning section 611.

Mirror position database 609 stores beforehand information relating to the positions of mirrors whereby a driver checks the situation outside a vehicle, such as a door mirror and rear-view mirror, (hereinafter referred to simply as "mirrors"), and the reflecting range (range of coverage) of each mirror as seen from the driver's position. External sensor section 610 detects the presence and position of a pedestrian or the like within a predetermined range outside the vehicle, and outputs a detection result. Warning determination section 608 has as input an external sensor section 610 detection result, driver's head direction information and eye direction information output from direction detection section 102, and an attention state determination result output from attention state determination section 105. Then warning determination section 608 determines whether or not the driver is paying attention to a mirror to which attention should be paid based on input information and information stored in mirror position database 609, and in the event of determining that the driver is not paying attention, directs warning section 611 to warn the driver. In accordance with the directive from warning determination section 608, warning section 611 gives the driver a voice warning as to which mirror attention should be paid to.

External sensor section 610 has a plurality of infrared sensors installed outside the vehicle, for example, detects the presence and position of a pedestrian, motorbike, bicycle, or the like (hereinafter referred to as "pedestrian or the like") within a predetermined range to the front, rear, left, and right of the exterior of the vehicle, and outputs a detection result. The above predetermined range is a range within which the driver should visually confirm the presence of a pedestrian from the standpoint of preventing an accident.

Attention state determination section 105 successively outputs attention state determination results indicating which of the three states "1. attention, 2. glance, 3. non-attention" the driver is in, as in Embodiment 1, to warning determination section 608.

When the presence of a pedestrian or the like is detected by external sensor section 610, warning determination section 608 first references mirror position database 609, identifies a mirror that includes the position of that pedestrian in its range of coverage, and identifies the position of that mirror. Warning determination section 608 determines that the identified mirror position should be paid attention to by the driver, and calculates the direction of the mirror as seen from the driver's seat. The directions of all mirrors may also be stored in mirror position database 609 beforehand, and warning determination section 608 may acquire the direction of the mirror from mirror position database 609.

Then warning determination section 608 determines whether or not the driver has visually checked for a pedestrian or the like by determining whether or not the driver has paid attention to the identified mirror position.

Since it is necessary for the driver mainly to pay attention to the road ahead while driving, checking in another direction using a mirror is performed in an extremely short time. Therefore, "attention" and "glance" are treated as states indicating visual checking.

If attention state determination section 105 makes an "attention" or "glance" determination, warning determination section 608 calculates the driver's line of sight direction from head direction information and eye direction information obtained from direction detection section 102. Specifically, for example, warning determination section 608 assumes that the body position and direction are fixed, adds together the head displacement angle relative to the front and the eyeball displacement angle relative to the front of the face, and finds the line of sight direction from the addition result and the driver's seat position.

Warning determination section 608 determines whether or not the direction of the mirror to which it has been determined that attention should be paid and the calculated line of sight direction coincide. If they do not coincide, warning determination section 608 determines that the driver is not checking using the mirror, outputs information indicating the identified mirror to warning section 611, and directs warning section 611 to warn the driver.

On receiving input of information indicating a particular mirror, warning section 611 outputs a voice announcement prompting the driver to look at the relevant mirror, such as "Please check the left mirror", for example, from a car audio speaker or suchlike speaker in the vehicle.

Thus, according to this embodiment, it can be determined whether or not a person is actually paying attention to an object to which attention should be paid. Also, a mirror to which attention should be paid from the standpoint of accident prevention can be identified, it can be determined whether or not the driver is actually paying attention to that mirror, and the driver can be prompted to pay attention by means of a warning if he is not paying attention. By this means, accidents due to driver inattention or oversight can be prevented. Furthermore, since a glance is regarded as a visual check, the occurrence of misreporting whereby a warning is given even though the driver checks a mirror very briefly can be prevented.

The time required to determine whether or not a warning is necessary can be shortened by having calculation of the line of sight direction performed constantly, regardless of whether an attention state determination result is "attention" or "glance", and regardless of an external sensor section 610 detection result.

Provision may also be made for external sensor section 610 to distinguish between a pedestrian, motorbike, and bicycle, to detect an attribute of a detected subject, such as the sex and/or age of a pedestrian, and output attribute information to warning determination section 608, and for warning determination section 608 to determine whether or not a warning is necessary, or to vary the type of warning, according to the attribute information.

In this case, for example, a reader may be provided that reads attribute information of a pedestrian or the like from an RF tag carried by a pedestrian or the like, or an apparatus may be provided that analyzes an image captured by a digital camera installed outside the vehicle, and determines an attribute of a detected subject. Also, a table in which attribute information is associated with warning issuance/non-issuance and a warning level may be prepared beforehand, and warning determination section 608 may reference this table and determine whether or not a warning is to be given and/or a warning level. By this means, warnings can be given to a driver with a finer degree of precision, with, for example, a warning being given only if a detected subject is an elderly person or a child.

Provision may also be made for external sensor section 610 to detect not only the position of a pedestrian or the like but also the direction of movement and speed of movement of a pedestrian or the like, and output this information to warning determination section 608, and for warning determination section 608 to determine whether or not a warning is necessary according to the direction of movement and speed of movement of a pedestrian or the like. In this case, warning determination section 608 would, for example, refer to the range of coverage of each mirror in mirror position database 609 and issue a warning only if a pedestrian or the like approached from a position closer than a predetermined distance at a speed greater than or equal to a predetermined speed.

Warning section 611 may also warn a driver by means of a method than the above-described voice output. For example, a pre-crash system warning tone, seatbelt tightening, automatic braking, or the like may be used.

At a location where a safety check of the surroundings should be carried out, such as an intersection, provision may be made to determine whether or not the driver has checked the surroundings based on the line of sight direction irrespective of whether or not a pedestrian or the like is present, and to issue a warning if a check has not been carried out. In this case, warning determination section 608 would, for example, set not only a mirror position but also directions in which attention should be paid to the front, rear, left, and right of the vehicle as seen from the driver's seat, and determine whether or not the line of sight direction coincides with all the set directions at least once, and whether or not the driver was in an "attention" or "glance" state at the timing of each coincidence.

Provision may also be made for mirror position database 609 not to be installed, but for warning section 611 to compare a direction when a pedestrian or the like detected by external sensor section 610 is seen directly from the driver's seat with the driver's line of sight direction.

Provision may also be made for warning determination section 608, to determine, when the driver is paying attention in the same direction, whether or not that line of sight direction coincides with the direction of movement of the vehicle or a mirror direction determined to be a direction in which attention should be paid, and to issue a warning if there is no such coincidence. At this time, frequent repeated glances, for example, are determined to be equivalent to "paying attention". Specifically, each time a "glance" attention state determination result is input, warning determination section 608 records the driver's line of sight direction at that time, and determines whether or not a glance has been repeated frequently—for example, three or more times within three seconds—in the same line of sight direction. Then, if a glance has been repeated in the same line of sight direction, warning determination section 608 determines whether or not that line of sight direction coincides with a mirror direction determined to be a direction in which attention should be paid, and if that line of sight direction does not so coincide, issues a warning urging the driver to concentrate. Alternatively, provision may be made for determination of whether or not a glance is repeated frequently in the same line of sight direction (attention determination condition 5) to be made by attention state determination section 105, and for a "concentration" rather than "glance" attention state determination result to be output in that case.

If the driver frequently directs his line of sight in the same direction, and that direction is not the direction of movement of the vehicle or a direction in which attention should be paid from the standpoint of accident prevention, it is highly probable that the driver is paying attention to something unrelated to driving. Issuing a warning urging concentration on driving in this way can contribute to reducing traffic accidents.

Furthermore, with a target object present in the same direction, also, an attention state determination condition or warning level may be varied according to the state of the target object or its degree of importance from a safety standpoint. For example, provision may be made for a warning not to be issued if a "glance" is given when a traffic signal or sign is detected, but for a warning to be issued despite a "glance" when a person darts into the road. Differentiating between the use of warnings according to circumstances in this way makes it possible both to cut down on unnecessary or erroneous warnings and to implement necessary warnings dependably.

Embodiment 4

In this embodiment, an image processing apparatus of the present invention is applied to a video playback apparatus that plays back video images recorded on a recording medium such as a DVD (Digital Versatile Disc) or hard disk.

Figure 15:
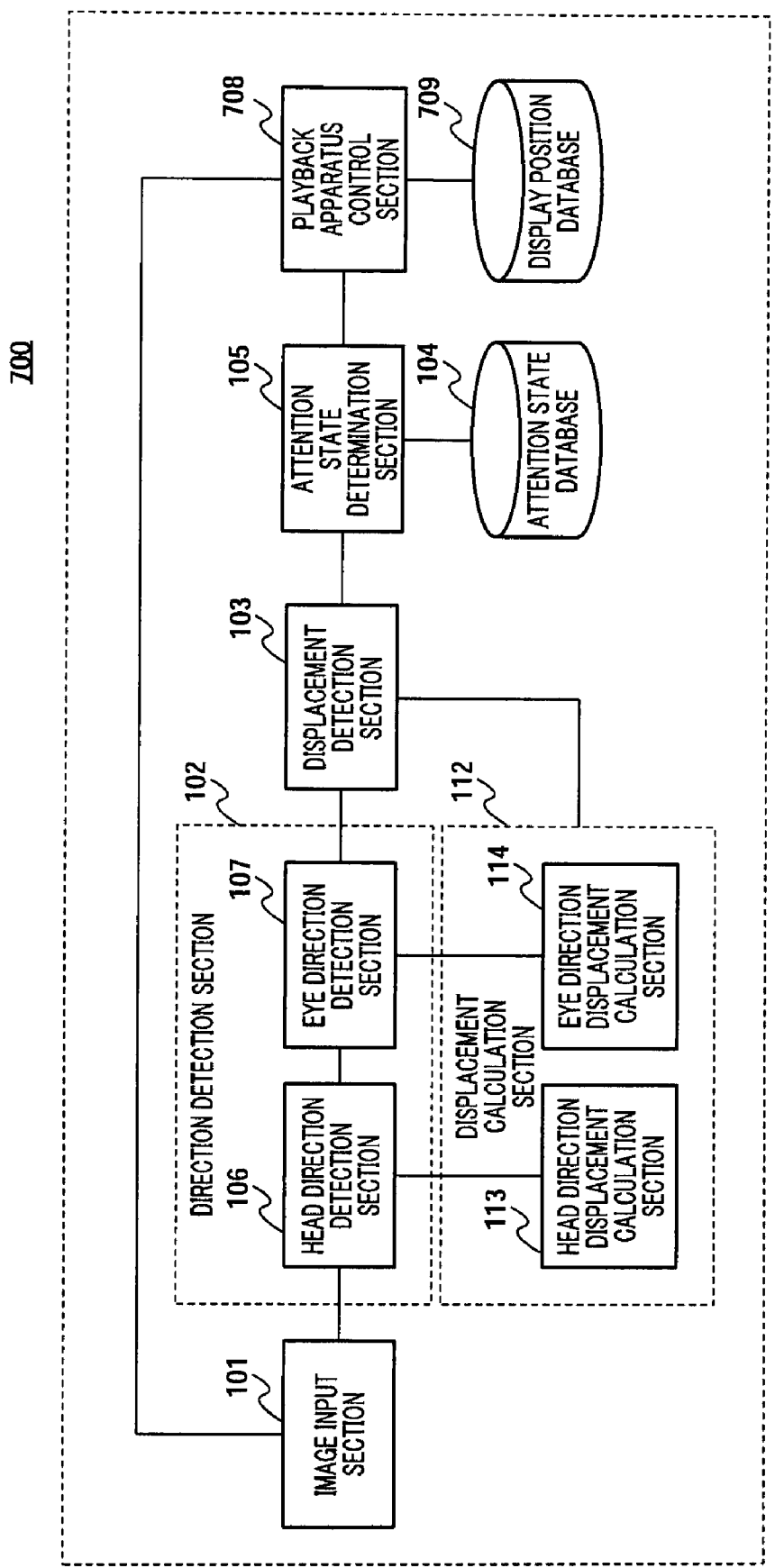
FIG. 15 is a block diagram showing the configuration of an image processing apparatus according to Embodiment 4 of the present invention.

FIG. 15 is a block diagram showing the configuration of an image processing apparatus according to Embodiment 4 of the present invention, and corresponds to FIG. 1 of Embodiment 1. Parts identical to those in FIG. 1 are assigned the same reference codes as in FIG. 1, and descriptions thereof are omitted here.

Image processing apparatus 700 has, in addition to configuration elements of Embodiment 1, playback apparatus control section 708 and display position database 709. Image processing apparatus 700 is connected to a video playback apparatus that plays back video images, and controls video image playback.

Image input section 101 of image processing apparatus 700 is installed in the vicinity of a television screen (not shown; hereinafter referred to simply as "screen"), and acquires an image in which a predetermined range is imaged from the screen side. That is to say, if there is a person watching television in front of a TV set, an image that includes that person is input.

Display position database 709 stores beforehand information relating to a screen position. A screen position is indicated, for example, by coordinate values relative to a viewpoint of imaging by image input section 101. Playback apparatus control section 708 has as input a person's head direction information and eye direction information output from direction detection section 102, and an attention state determination result output from attention state determination section 105. Then playback apparatus control section 708 determines whether or not a person is in a non-attention state with respect to a video image being played back from input information and information stored in display position database 709, and controls the video playback apparatus so as to rewind the video playback section corresponding to the non-attention state.

In the same way as in Embodiment 1, direction detection section 102 and attention state determination section 105 sequentially output head direction information and eye direction information, and attention state determination results, respectively.

If a person's line of sight is not directed toward the screen, or if an attention state determination result is "non-attention", playback apparatus control section 708 determines that the person is not watching the played-back video, and rewinds and plays back the unwatched video section.

Specifically, playback apparatus control section 708 first calculates the person's line of sight direction from head direction information and eye direction information, references display position database 709, and determines whether or not the screen is positioned in the person's line of sight direction—that is, whether or not the person's line of sight is directed toward the screen. If the person's line of sight is not directed toward the screen, playback is temporarily stopped, or information indicating the current video image playback position is stored as a non-attention start position, and playback is continued. A time code indicating a video absolute time added to a video image, for example, can be used for non-attention start position recording.

If the person's line of sight is directed toward the screen, playback apparatus control section 708 next determines whether or not the attention state determination result is "non-attention", and if it is "non-attention", temporarily stops playback, or stores information indicating the current video image playback position as a non-attention start position and continues playback. If the attention state determination result is "glance" at this time, it is determined that the person has merely looked away momentarily, and is in fact watching the video.

When playback apparatus control section 708 performs temporary playback stoppage or non-attention start position storage, it watches for the person's line of sight to become directed toward the screen, and for the attention state determination result to become "attention" or "glance". Then, when the person's line of sight becomes directed toward the screen and the attention state determination result becomes "attention" or "glance", playback apparatus control section 708 determines that the person is watching the played-back video, cancels temporary playback stoppage if this has been performed, and if playback has been temporarily stopped after continuing playback, rewinds to the non-attention start position.

Thus, according to this embodiment, it is possible to prevent video playback from being continued even though a viewer is not watching the video, and to enable the viewer to watch continuous video. Also, since temporary playback stoppage or rewinding is not performed when the attention state determination result is "glance", video playback is performed as usual in the event of momentary inattention or the like, and the viewer can watch video efficiently.

Provision may also be made for playback restarting or rewinding not to be performed immediately in the event of a single glance, but when a glance has been repeated frequently—namely, three or more times within three seconds. This makes it possible to prevent a situation in which video is played back even though a viewer is not actually watching the video. Envisaged applicable videos are general video programs including educational videos, movies, and dramas. This embodiment is particularly effective when applied to educational videos for which uninterrupted viewing is desirable.

Embodiment 5

In this embodiment, an image processing apparatus of the present invention is applied to a suspicious-individual surveillance system that detects a suspicious individual engaged in suspicious behavior, such as peeping or prying, using a surveillance camera.

Figure 16:
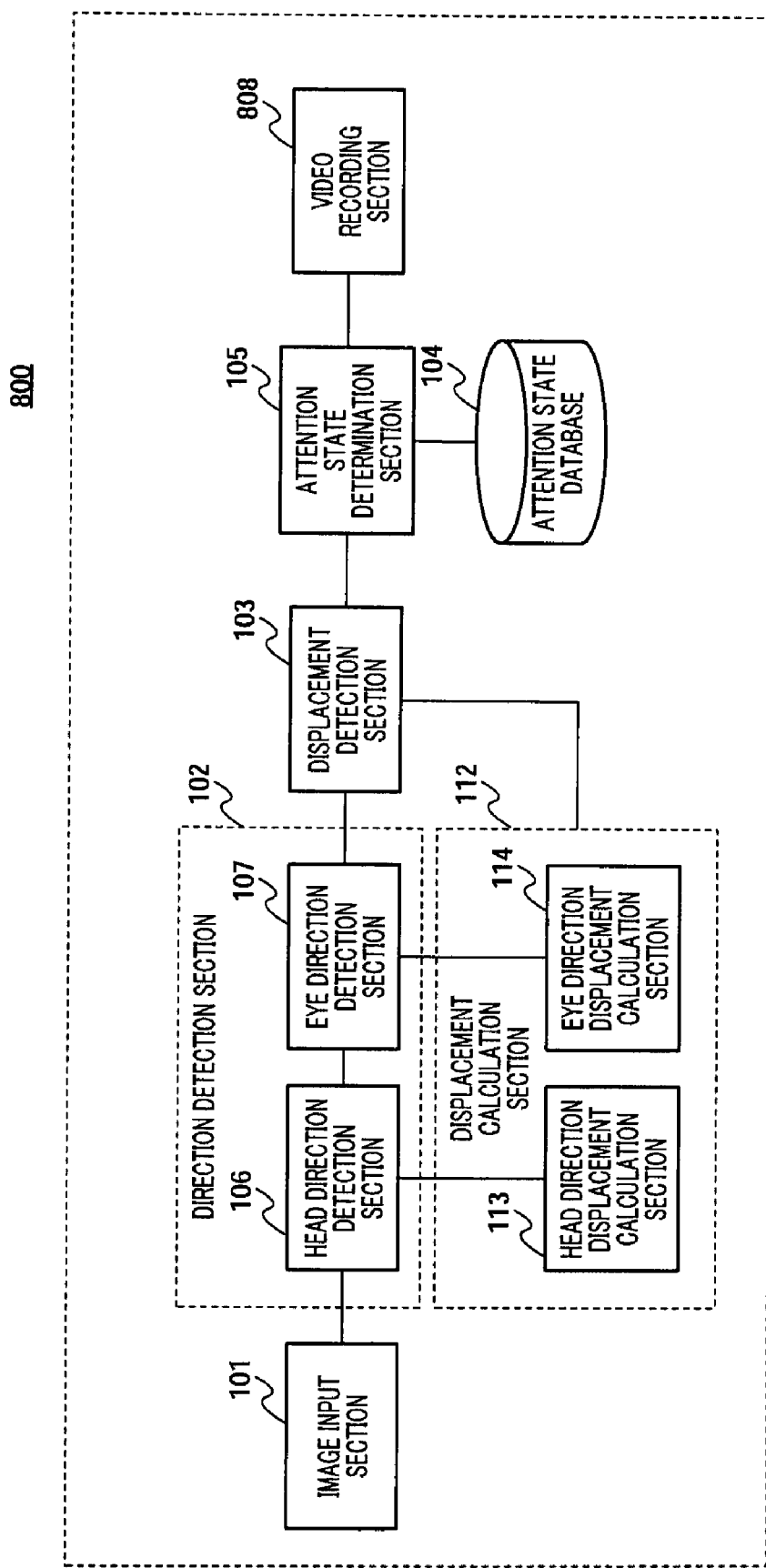
FIG. 16 is a block diagram showing the configuration of an image processing apparatus according to Embodiment 5 of the present invention.

FIG. 16 is a block diagram showing the configuration of an image processing apparatus according to Embodiment 5 of the present invention, and corresponds to FIG. 1 of Embodiment 1. Parts identical to those in FIG. 1 are assigned the same reference codes as in FIG. 1, and descriptions thereof are omitted here.

Image processing apparatus 800 has, in addition to configuration elements of Embodiment 1, video recording section 808. Video recording section 808 determines the presence of a person peeping into a residence from an input image, and records an image showing that person.

Image input section 101 of image processing apparatus 800 is installed on the outside of a residence subject to surveillance, in the vicinity of a window, for example, and acquires an image in which a predetermined range is imaged from the window side. That is to say, if there is a person peeping through the window from outside, an image that includes that person is input. In the same way as in Embodiment 1, image input section 101 and attention state determination section 105 sequentially output captured images and attention state determination results of a person included in captured images.

Video recording section 808 has as input an image output from image input section 101 and an attention state determination result output from attention state determination section 105. Then, if an attention state determination result is "attention", video recording section 808 determines that it is highly probable that a suspicious individual is peeping into the residence, and records an image. In this way, image recording can be limited to a case in which there is a high probability of a suspicious individual peeping into the residence, enabling images subject to checking for the presence of a suspicious individual to be kept to a minimum, and allowing a suspicious individual and suspicious activity to be detected efficiently. Also, since determination as to where a person's line of sight is directed is not performed, processing can be simplified, and the size and cost of the apparatus can be kept down.

Instead of video recording section 808, a warning section may be provided that sounds an alarm when the attention state determination result is "attention". Furthermore, this embodiment may be applied not only to private residences but also to places where a person paying attention in a certain direction is highly likely to be a suspicious individual, such as the entrance of a jewelry store, a bank ATM, or the like.

Embodiment 6

In this embodiment, an image processing apparatus of the present invention is applied to an advertisement evaluation system that evaluates an advertisement based on the attention state of a test subject with respect to a page of a newspaper or a Web page on the Internet containing a plurality of advertisements.

Figure 17:
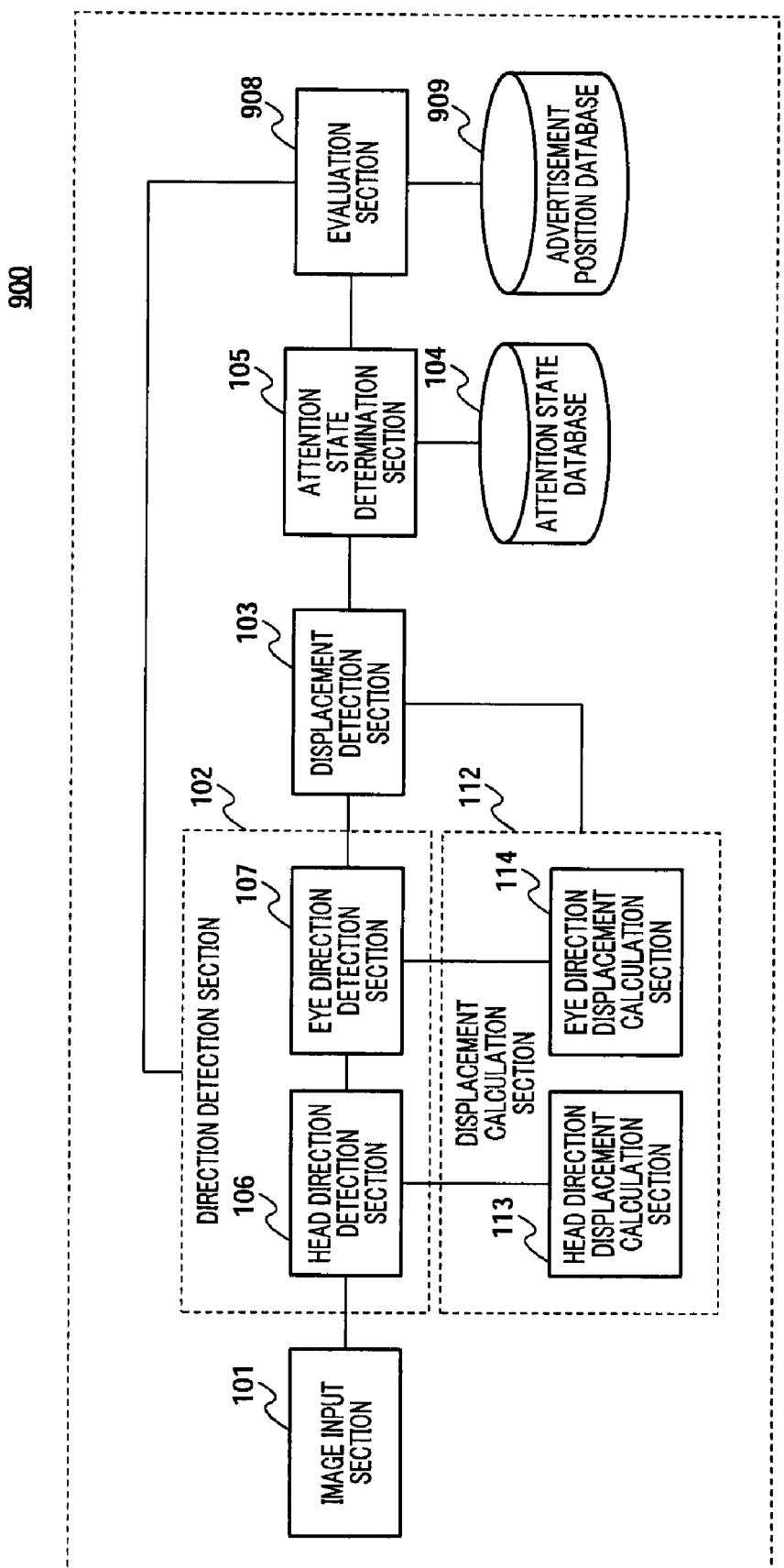
FIG. 17 is a block diagram showing the configuration of an image processing apparatus according to Embodiment 6 of the present invention.

FIG. 17 is a block diagram showing the configuration of an image processing apparatus according to Embodiment 6 of the present invention, and corresponds to FIG. 1 of Embodiment 1. Parts identical to those in FIG. 1 are assigned the same reference codes as in FIG. 1, and descriptions thereof are omitted here.

Image processing apparatus 900 has, in addition to configuration elements of Embodiment 1, evaluation section 908 and advertisement position database 909. Image processing apparatus 900 shows a page containing a plurality of advertisements to a test subject, determines where on the page the person acting as a test subject is paying attention from an input image, and evaluates the effectiveness of each advertisement. Here, a case will be described in which advertisements arranged on a Web page displayed on a display are evaluated.

Image input section 101 of image processing apparatus 900 is installed in the vicinity of a display, and acquires an image in which a range in which a test subject is positioned is imaged from the display side. Since the present invention performs attention state determination based on the relationship between head direction displacement and eye direction displacement, it is desirable for the display to be at least large enough for head direction displacement to be detected when the test subject pays attention to each advertisement. In the same way as in Embodiment 1, direction detection section 102 and attention state determination section 105 sequentially output head direction information and eye direction information, and attention state determination results, respectively.

Advertisement position database 909 stores beforehand, for each Web page on which advertisements to be evaluated are arranged, the display position of each advertisement when each Web page is displayed on a display.

Evaluation section 908 has as input head direction information and eye direction information output from direction detection section 102, and an attention state determination result output from attention state determination section 105. When display of a Web page on which advertisements to be evaluated are arranged is started, evaluation section 908 calculates a person's line of sight direction from head direction information and eye direction information, references advertisement position database 909, and determines which advertisement is positioned in the person's line of sight direction—that is, to which advertisement the person is directing his line of sight.

When evaluation section 908 determines that the person is directing his line of sight toward one of the advertisements, it evaluates the effectiveness of the advertisement based on the attention state determination result. Specifically, if the attention state determination result is "attention", evaluation section 908 evaluates the relevant advertisement as having an appearance that is eye-catching to some extent together with content that also attracts the attention, and as being highly effective as an advertisement. If the attention state determination result is "non-attention", evaluation section 908 evaluates the relevant advertisement as not being eye-catching in appearance, and having little effectiveness as an advertisement. If the attention state determination result is "glance", evaluation section 908 evaluates the relevant advertisement as having an eye-catching appearance but content that does not attract much attention, and as having fairly little effectiveness as an advertisement. Lastly, an advertisement toward which the line of sight is not directed even once is evaluated as being extremely non-eye-catching in appearance, and as having very little effectiveness as an advertisement.

Thus, according to this embodiment, evaluation of an advertisement can be performed based on the attention state of a test subject. Also, an advertisement can be evaluated according to whether the test subject pays attention to, glances at, does not pay attention to, or does not direct his line of sight toward, that advertisement, enabling highly precise analysis to be performed.

Each time it is determined that a person is directing his line of sight to an advertisement, information associating an attention state determination result with that advertisement may be stored, and advertisement evaluation may be performed based on the accumulated information. In this case, the number of times and total time for which attention is paid, line of sight movement history information, and so forth, can be used for evaluation. This embodiment may also be applied to evaluation of something that presents a plurality of information items or objects at one time, such as a guideboard, display panel, or the like.

Embodiment 7

In this embodiment, an image processing apparatus of the present invention is applied to an automatic imaging system whereby a person automatically shoots an object to which that person is paying attention with a wearable camera worn by that person. An example is described below of a case in which automatic imaging is performed by means of a wearable camera worn by someone at an exhibition site.

Figure 18:
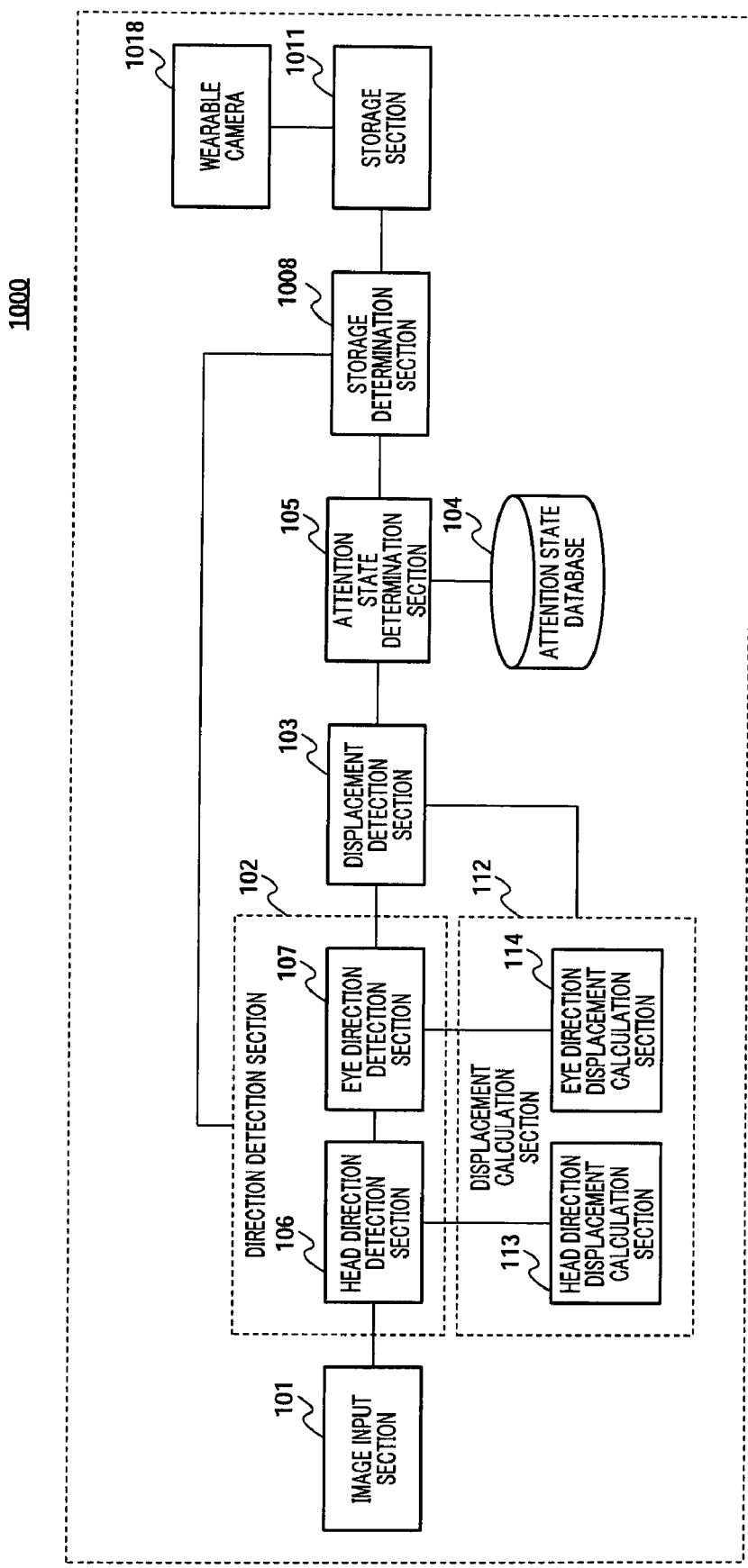
FIG. 18 is a block diagram showing the configuration of an image processing apparatus according to Embodiment 7 of the present invention.

FIG. 18 is a block diagram showing the configuration of an image processing apparatus according to Embodiment 7 of the present invention, and corresponds to FIG. 1 of Embodiment 1. Parts identical to those in FIG. 1 are assigned the same reference codes as in FIG. 1, and descriptions thereof are omitted here.

Image processing apparatus 1000 has, in addition to configuration elements of Embodiment 1, storage determination section 1008, storage section 1011, and wearable camera 1018. Image processing apparatus 1000 detects the fact that a person wearing wearable camera 1018 is paying attention to an object or information of some kind from an image captured by a remote camera installed in an exhibition site, and shoots that object of interest by remote operation of wearable camera 1018.

Image input section 101 of image processing apparatus 1000 receives via radio communication images captured by remote cameras installed above the exhibition site in positions and numbers that enable the faces of people at the exhibition site to be shot. Provision may be made for image input section 101 to receive only images that include a person wearing wearable camera 1018. This image differentiation can be implemented, for example, by using a wearable camera 1018 equipped with an RFID tag, and adding an ID acquired by a remote camera from an RFID tag present in its own shooting range to a transmitted image. In the same way as in Embodiment 1, direction detection section 102 and attention state determination section 105 sequentially output head direction information and eye direction information, and attention state determination results, respectively.

Storage determination section 1008 has as input head direction information and eye direction information output from direction detection section 102, and an attention state determination result output from attention state determination section 105. If an "attention" attention condition determination result is input, or numerous "glance" attention condition determination results are input, storage determination section 1008 determines information or an object in the person's line of sight direction to be information or an object that should be imaged, and issues an imaging directive to storage section 1011. Specifically, storage determination section 1008 calculates the person's line of sight direction from head direction information and eye direction information, determines a storage location of an image to be captured, and outputs information indicating the line of sight direction and storage location to storage section 1011. The storage location can be set, for example, according to the attention level (attention state), imaging area, imaging date and time, and so forth. In accordance with the storage determination section 1008 directive, storage section 1011 performs imaging using wearable camera 1018 with the line of sight direction as the imaging direction, and stores the captured image in the directed storage location.

Thus, according to this embodiment, it is possible to perform automatic imaging of only something to which a person pays attention by means of a wearable camera 1018 having a viewpoint close to the viewpoint of the person. Also, since a storage location can be set according to an attribute of a captured image, a desired image can easily be found among stored images, creation of a diary or travel journal is simplified, and the utility value of captured images can be increased.

When an image captured by wearable camera 1018 is stored, various kinds of metadata, such as an attention level (attention state), may also be added. In this case, it is possible to perform an image search using metadata, and therefore a storage location need not necessarily be set. Also, image processing apparatus 1000 need not necessarily be integral with wearable camera 1018, and the sections from image input section 101 to storage determination section 1008, for example, may be provided in a remote camera, an exhibition site computer, or the like. In this case, most of image processing apparatus 1000 can be shared by a plurality of persons, enabling overall system costs to be reduced.

In Embodiment 1 through Embodiment 7 according to the description of the present application, an invention of an image processing apparatus has been described, but an invention of a processing method can also be conceived of that represents the processing performed by this image processing apparatus methodically and enables the same kind of effects to be obtained as provided by an above image processing apparatus.

Also, the same kind of effects as provided by an image processing apparatus of the present application can be obtained by having the configuration elements of an above image processing apparatus function organically by means of a program that describes processing performed by an above image processing apparatus.

An invention of such a program can also be conceived of.

The disclosure of Japanese Patent Application No. 2005-374448, filed on Dec. 27, 2005, and Japanese Patent Application No. 2006-349800 filed on Dec. 26, 2006, including the specification, drawings and abstract is incorporated herein by reference in its entirety.

INDUSTRIAL APPLICABILITY

An image processing apparatus according to the present invention is suitable for use as an information terminal such as a personal computer, OA device, or mobile phone, or an information provision apparatus installed in a means of transportation such as an automobile, aircraft, boat, or train. An image processing apparatus according to the present invention can also be applied to such uses as a surveillance apparatus, a robot, a video/audio playback apparatus, or the like.

The invention claimed is:

1. An image processing apparatus comprising:
a direction detection section that detects, from a predetermined image including a person image, direction information in two body regions of a person represented by the person image;
a displacement detection section that calculates, from the two direction information items, a displacement ratio that is a ratio between two direction displacements; and
an attention state determination section that performs determination of an attention level of a person toward a predetermined object based on a first displacement ratio calculated by the displacement detection section using first direction information detected by the direction detection section from a first predetermined image including a first person image, and a second displacement ratio calculated by the displacement detection section using second direction information detected by the direction detection section from a second predetermined image including the first person image.

2. The image processing apparatus according to claim 1, further comprising an attention state database that stores an attention determination condition that stipulates an attention level of the person toward a predetermined object,
wherein the attention state determination section performs determination of an attention level of the person toward a predetermined object by checking information based on the first displacement ratio and the second displacement ratio with the attention determination condition.

3. The image processing apparatus according to claim 1, wherein:
the direction detection section comprises:
a head direction detection section that detects a direction of a head of a person represented by the person image from the predetermined image; and
an eye direction detection section that detects a direction of an eyeball of a person represented by the person image from the predetermined image, and
the displacement detection section calculates a displacement ratio from head direction information based on the head direction and eye direction information based on the eye direction.

4. The image processing apparatus according to claim 3, further comprising a head direction displacement calculation section that takes a displacement ratio between a body direction of a person represented by the person image and a head direction of a person represented by the person image as the head direction information.

5. The image processing apparatus according to claim 3, further comprising an eye direction displacement calculation section that takes a displacement ratio between a head direction of a person represented by the person image and an eye direction of a person represented by the person image as the eye direction information.

6. The image processing apparatus according to claim 1, further comprising an image input section that captures the predetermined image,
wherein the first predetermined image and the second predetermined image are images whose time of capture by the input section differs.

7. The image processing apparatus according to claim 2, further comprising a learning section that updates the attention determination condition held by the attention state database.

* * * * *